US008524854B2

(12) United States Patent  
Chiong et al.

(10) Patent No.: US 8,524,854 B2
(45) Date of Patent: Sep. 3, 2013

(54) CHLORO-SUBSTITUTED POLYETHERIMIDES HAVING IMPROVED RELATIVE THERMAL INDEX

(75) Inventors: Hendrich Chiong, Evansville, IN (US); Thomas Link Guggenheim, Mount Vernon, IN (US); Farid Fouad Khouri, Clifton Park, NY (US); Matthew L. Kuhlman, Evansville, IN (US); Miguel Angel Navarro de Castro, Pozuelo de Alarcon (ES); Roy Ray Odle, Mount Vernon, IN (US); Brennan A. Smith, Decatur, IL (US)

(73) Assignee: Sabic Innovative Plastics IP B.V. (NL)

( * ) Notice: Subject to any disclaimer, the term of this patent is extended or adjusted under 35 U.S.C. 154(b) by 216 days.

(21) Appl. No.: 13/059,691

(22) PCT Filed: Dec. 28, 2010

(86) PCT No.: PCT/US2010/062191
§ 371 (c)(1), (2), (4) Date: Jul. 19, 2011

(87) PCT Pub. No.: WO2011/082147
PCT Pub. Date: Jul. 7, 2011

(65) Prior Publication Data
US 2011/0263791 A1    Oct. 27, 2011

(51) Int. Cl.
*C08G 73/10* (2006.01)
(52) U.S. Cl.
USPC .......................................... 528/170; 525/132
(58) Field of Classification Search
USPC ........................................................ 528/170
See application file for complete search history.

(56) References Cited

U.S. PATENT DOCUMENTS

| 4,417,044 | A |   | 11/1983 | Parekh |
| 4,546,207 | A | * | 10/1985 | Mendiratta et al. ............ 568/723 |
| 4,757,150 | A | * | 7/1988 | Guggenheim et al. ........ 548/461 |
| 4,950,729 | A | * | 8/1990 | Daniels ............................ 528/86 |
| 4,999,251 | A | * | 3/1991 | Foust et al. .................... 428/458 |
| 5,663,275 | A | * | 9/1997 | Schmidhauser ............... 528/125 |
| 6,020,456 | A | * | 2/2000 | Brunelle et al. .............. 528/353 |
| 6,235,866 | B1| * | 5/2001 | Khouri et al. ................. 528/125 |
| 6,881,815 | B2| * | 4/2005 | Odle et al. ..................... 528/170 |
| 7,125,954 | B2| * | 10/2006 | Guggenheim et al. ........ 528/491 |
| 7,714,095 | B2| * | 5/2010 | Brunelle et al. .............. 528/322 |
| 8,309,637 | B2| * | 11/2012 | Sanner et al. .................. 524/151 |

FOREIGN PATENT DOCUMENTS

EP    1426358 A2    6/2004
WO    2009/143440 A1    11/2009

OTHER PUBLICATIONS

International Search Report for PCT/US2010/062191, mailed Mar. 23, 2011, 4 pages.
Written Opinion of the International Searching Authority for PCT/US2010/062191, mailed Mar. 23, 2011, 6 pages.
Blyumenfeld et al., Structure Thermal Stability and Thermal Stabilization of the Engineering Polyimide and Polysulfone Resins, Intern. J. Polymeric Mater., 1999, vol. 44, pp. 95-105.
Quafisheh et al., Potassium Phosphate as a High-Performance Solid Base in Phase-Transfer-Catalyzed Alkylation Reactions, Ind. Eng. Chem. Res. 2007, 46, 3016-3023.

* cited by examiner

*Primary Examiner* — Mike M Dollinger
(74) *Attorney, Agent, or Firm* — Cantor Colburn LLP; Diderico van Eyl

(57) ABSTRACT

A polyetherimide having an OH content that is greater than 0 and equal or less than 100 ppm; a Relative Thermal Index that is greater than or equal to 170° C.; and a chlorine content that is greater than 0 ppm is disclosed herein. A method for preparing the polyetherimide is also disclosed.

29 Claims, 3 Drawing Sheets

RTI aging results for control resin (ULTEM 1000/1000, NDU) and candidate resin (CDU)

Figure 1: RTI aging results for control resin (ULTEM 1000/1000, NDU) and candidate resin (CDU)

Figure 2: RTI extrapolation

CHLORO-SUBSTITUTED POLYETHERIMIDES HAVING IMPROVED RELATIVE THERMAL INDEX

BACKGROUND

The invention relates to the field of polyetherimides. Polyetherimides are engineering thermoplastics that are thermally stable and find many applications under demanding elevated temperatures. Polyetherimides made by chloro-displacement methods are known.

Unfortunately, it has been discovered that chloro-substituted polyetherimides made by chloro-displacement methods exhibit diminished Relative Thermal Index properties that do not meet some commercial applications. The Relative Thermal Index is a known property that indicates how a polymer's properties degrade after being subjected to heat aging. Materials are investigated with respect to retention of certain critical properties (e.g., dielectric strength, flammability, impact strength, and tensile strength) as part of a long-term thermal-aging program conducted in accordance with Underwriters Laboratories, Inc. Standard for Polymeric Materials-Long Term Property Evaluations (UL746B). The end-of-life of a material at each test temperature in this program has been assumed to be the time when the value of the critical property has decreased to 50% of its original (as received) value.

For the foregoing reasons, there is an ongoing, unmet need for chloro-substituted polyetherimides having improved Relative Thermal Index properties, and methods of making such chloro-substituted polyetherimides.

SUMMARY

Disclosed herein is a polyetherimide comprising a structural unit of Formula (I):

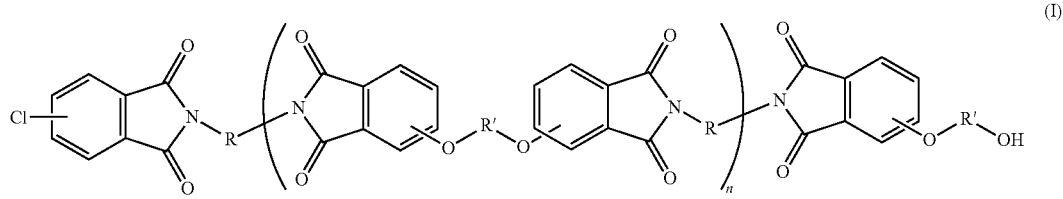

wherein R and R' can be a linear or cyclic $C_2$ to $C_{20}$ alkyl group or a substituted or unsubstituted $C_6$ to $C_{30}$ aryl group, n has a value of 1 to 40, wherein the polyetherimide has an OH content that is greater than 0 and less than or equal to 100 parts per million by weight (ppm);

wherein the polyetherimide has a Relative Thermal Index that is greater than or equal to 170° C.; and wherein the polyetherimide has an chlorine content that is greater than 0 ppm.

Also disclosed herein is a polyetherimide comprising a structural unit of Formula (III)

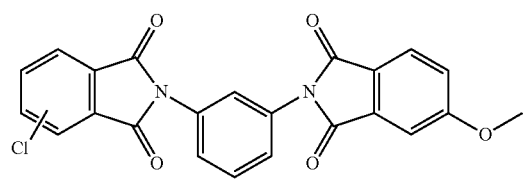

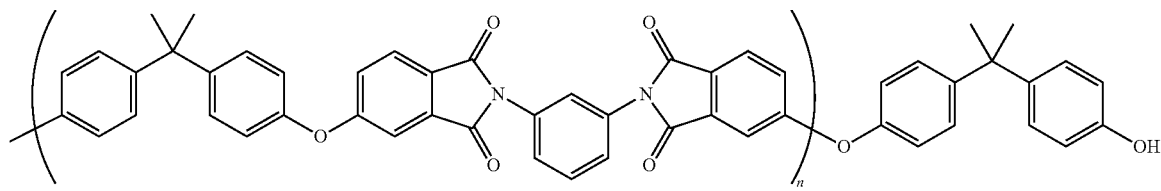

wherein n is an integer having a value of 1 to 40;

wherein the polyetherimide has an OH content that is greater than 0 and less than or equal to 100 parts per million by weight (ppm);

wherein the polyetherimide has a Relative Thermal Index that is greater than or equal to 170° C.; and wherein the polyetherimide has an chlorine content that is greater than 0 ppm.

Also disclosed is a method for making a polyetherimide that has a structural unit of Formula (I) that involves contacting, in o-dichlorobenzene or anisole as diluent, substantially equimolar amounts of a disodium salt of a dihydroxy compound of formula HO—R'—OH, and a slurry of a bisimide, in the presence of a catalytically active amount of a phase transfer catalyst, thereby polymerizing the bisimide and the disodium salt;

wherein the bisimide and the disodium salt are polymerized in the presence of a base selected from the group consisting of alkali metal carbonates, alkyl hydrides, alkali metal hydroxides, alkali metal phosphates, alkali metal bicarbonates, alkali metal acetates, and combinations thereof;

wherein said slurry of bisimide comprises the reaction product of a mixture comprising a diamine of formula $H_2N$—R—$NH_2$; chlorophthalic anhydride; optional phthalic anhydride; and o-dichlorobenzene or anisole; and an optional imidization catalyst, said mixture having a solids content of greater than or equal to about 5% by weight;

wherein the base is added in an amount that is sufficient to produce the polyetherimide having the OH content specified above.

Also disclosed is a method for making a polyetherimide that has a structural unit of Formula (III) that involves contacting, in o-dichlorobenzene or anisole as diluent, substantially equimolar amounts of bisphenol A disodium salt and a slurry of 1,3-bis[N-(4-chlorophthalimido)]benzene, in the presence of a catalytically active amount of a hexaalkylguanidinium chloride as a phase transfer catalyst, thereby polymerizing the 1,3-bis[N-(4-chlorophthalimido)]benzene and the bisphenol A disodium salt;

wherein the 1,3-bis[N-(4-chlorophthalimido)]benzene and the bisphenol A disodium salt are polymerized in the presence of a base selected from the group consisting of alkali metal carbonates, alkyl hydrides, alkali metal hydroxides, alkali metal phosphates, alkali metal bicarbonates, alkali metal acetates, and combinations thereof;

wherein said slurry of 1,3-bis[N-(4-chlorophthalimido)]benzene comprises the reaction product of a mixture comprising m-phenylenediamine; 4-chlorophthalic anhydride; optional phthalic anhydride and o-dichlorobenzene or anisole; and an optional imidization catalyst, said mixture having a solids content of greater than or equal to about 5% by weight;

wherein the base is added in an amount that is sufficient to produce the polyetherimide having the OH content specified above.

In another embodiment, the invention relates to a polyetherimide having the structure of Formula (III):

wherein n is an integer having a value of 1 to 40;

wherein the polyetherimide has an OH content that is greater than 0 and less than or equal to 100 ppm;

wherein the polyetherimide has a Relative Thermal Index that is greater than or equal to 170° C.;

wherein the polyetherimide has an chlorine content that is greater than 0 ppm;

wherein the polyetherimide is made by a method comprising contacting, in o-dichlorobenzene or anisole as diluent, substantially equimolar amounts of bisphenol A disodium salt and a slurry of 1,3-bis[N-(4-chlorophthalimido)]benzene, in the presence of a catalytically active amount of a hexaalkylguanidinium chloride as a phase transfer catalyst, thereby polymerizing the 1,3-bis[N-(4-chlorophthalimido)]benzene and the bisphenol A disodium salt;

wherein the 1,3-bis[N-(4-chlorophthalimido)]benzene and the bisphenol A disodium salt are polymerized in the presence of a base selected from the group consisting of alkali metal carbonates, alkyl hydrides, alkali metal phosphates, alkali metal bicarbonates, alkali metal hydroxides, alkali metal acetates, and combinations thereof;

wherein said slurry of 1,3-bis[N-(4-chlorophthalimido)]benzene comprises the reaction product of a mixture comprising m-phenylenediamine; 4-chlorophthalic anhydride; optional phthalic anhydride; and o-dichlorobenzene or anisole; and an imidization catalyst, said mixture having a solids content of greater than or equal to about 5% by weight;

wherein the base is added in an amount that is sufficient to produce the polyetherimide with less than or equal to 100 ppm hydroxy endgroups.

These and other features, aspects, and advantages of the present invention will become better understood with reference to the following description and appended claims.

DESCRIPTION

Figure 1:
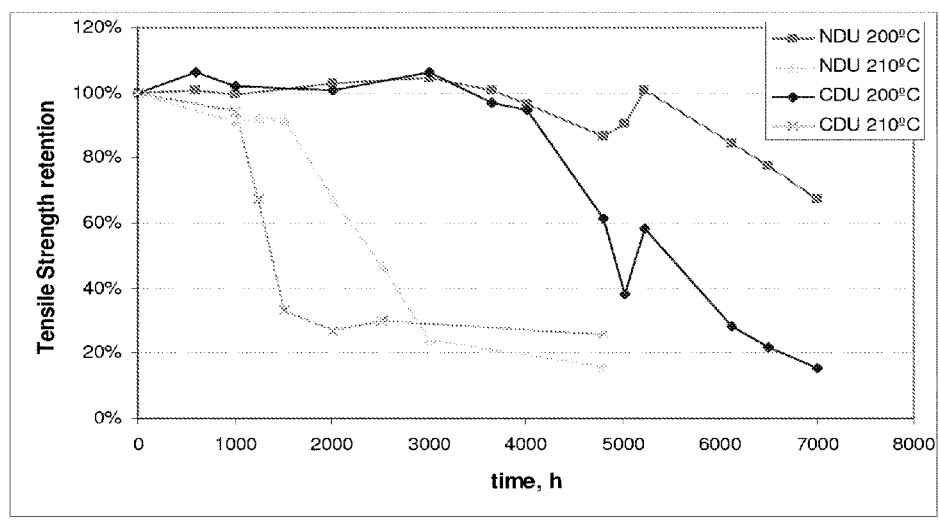
FIG. 1 is a graphical representation of RTI aging results for a control resin and a candidate resin.

The invention is based on the surprising discovery that it is now possible to make polyetherimides having a Relative Thermal Index (RTI) of 170° C. or more by reducing the hydroxyl group content in the polyetherimide to a range that is greater than 0 to less than or equal to 100 ppm by the use of a specific set of bases and process conditions. Remarkably, it has been discovered that when the polyetherimide has an OH group content that ranges from greater than 0 to less than or equal to about 100 ppm, the polyethermide exhibits an RTI of 170° C. or more and when the polyetherimide has an OH group content that is greater than about 100 ppm, the polyetherimide exhibits an RTI that is less than 170° C. Surpris- (III)

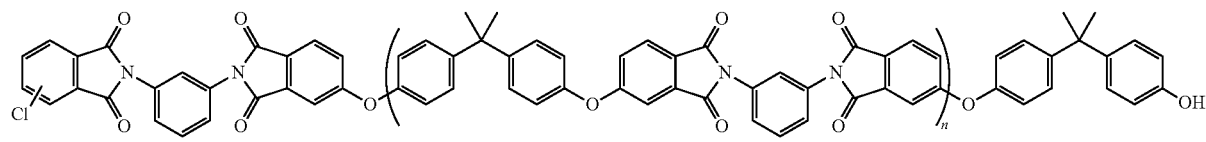

ingly, the use of stabilizers has not proven to be a useful way to produce polyetherimides having RTI of 170° C. or more.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

The polyetherimide has a structural unit of the Formula (I)

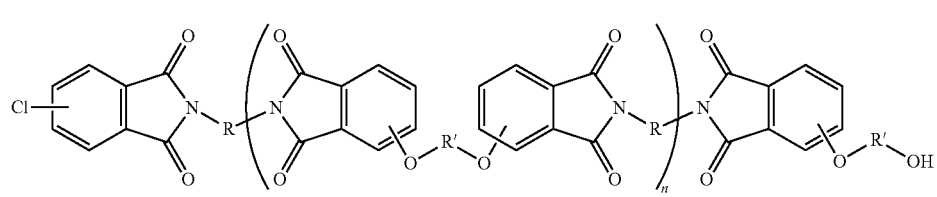

In one embodiment, the polyetherimide further comprises a structural unit having the Formula (II)

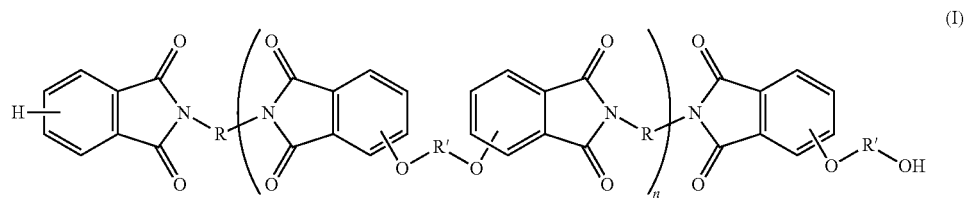

In Formulas (I) and (II) R can be a linear or cyclic alkyl group of 2 carbons to 20 carbons wherein the valance of each carbon is satisfied by being covalently bound to hydrogen or a combination of hydrogen, halogen, oxygen, sulfur, and nitrogen. R can also be an aryl substituted containing radical with the general Formula of

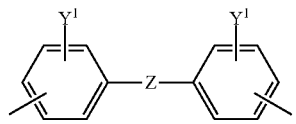

where Z can be a covalent bond between the two aryl rings, or one of the following linkages:

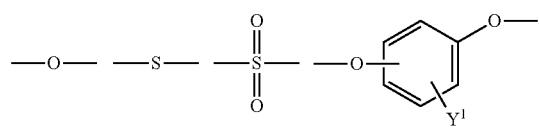

$Y^1$ can be hydrogen, or an alkyl, halo or substituted aryl group.

Most often R is substituted aryl benzene radical covalently bonded at the meta or para position:

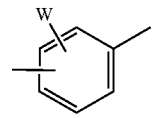

W can be hydrogen, alkyl, halo, or a substituted aryl group. Specifically R is a benzene radical covalently bonded at the meta or para position.

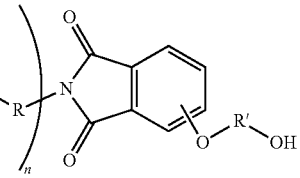

(II)

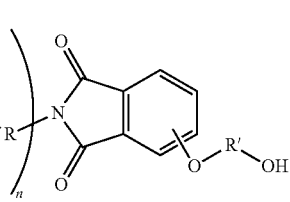

(I)

In Formulas (I) and (II) R' can have the general structure:

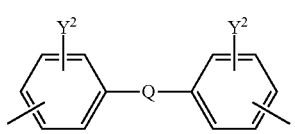

where Q is a covalent bond or one of the following linkages:

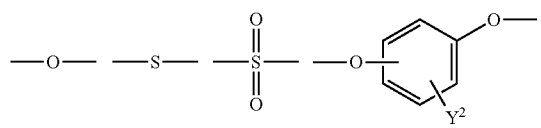

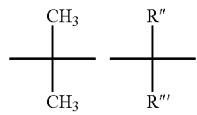

$Y^2$ can be hydrogen, an alkyl group or substituted aryl group. R" and R'" can be an alkyl group containing only hydrogen or hydrogen and a halogen, or a substituted aryl group.

R' can also have the structure:

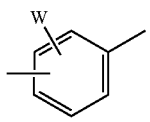

W can be hydrogen or an alkyl or substituted aryl group. Specifically, W is hydrogen and the benzene is covalently bonded in the meta or para position.

Specifically R' can be

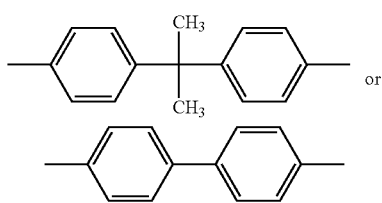

More particularly, in one embodiment, the polyetherimide has the structural unit of Formula (III):

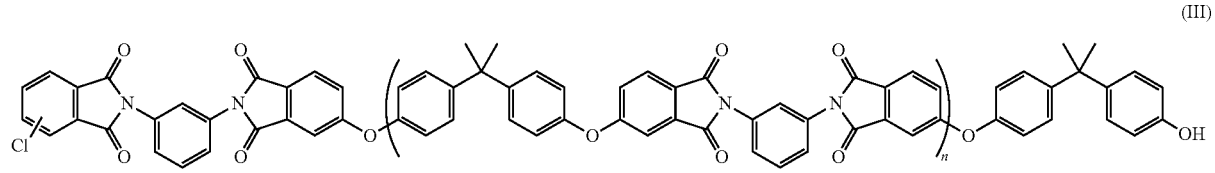

wherein n is an integer ranging having a value of 1 to 40;

wherein the polyetherimide has an OH content that is greater than 0 and less 100 ppm;

wherein the polyetherimide has a Relative Thermal Index that is greater than or equal to 170° C.; and wherein the polyetherimide has a chlorine content that is greater than 0 ppm.

The polyetherimide has a Relative Thermal Index (RTI) that is greater than or equal to 170° C., as determined by Underwriting Laboratories (UL® protocol UL746B). The Relative Thermal Index can be obtained directly by performing the extended test in accordance with the UL746B protocol as described in the Examples, or may be indirectly inferred with an accelerated heat aging testing method also as described in the Examples. Briefly, the RTI is inferred by comparing the peak molecular weight (Mp) degradation (decrease) of an experimental sample with the peak (Mp) degradation of a control sample that is a polyetherimide made by a nitro-displacement method (a method in which the polyetherimide is made from bisphenol-A dianhydride, phthalic anhydride and metaphenylene diamine) that has been verified to have a Relative Thermal Index of greater than or equal to 170° C. by UL® protocol UL746B. When the percent peak molecular weight degradation of an experimental sample is within 10% of the percent peak molecular weight degradation of the control sample, the Relative Thermal Index of the experimental sample is said to have the same Relative Thermal Index of the control sample, which is greater than or equal to 170° C. By contrast, when the percent peak molecular weight degradation of an experimental sample is greater than 10% of the percent peak molecular weight degradation of the control sample that is a polyetherimide made by a nitro-displacement method and made from a dianhydride and metaphenylene diamine, the Relative Thermal Index of the experimental sample is said to have a Relative Thermal Index of less than 170° C., e.g., 160° C. For example, if the peak molecular weight (Mp) drop of a control sample at 230° C. in 12 or 13 days is 8%, then a resin with less than or equal to 18% Mp drop would have the equivalent RTI rating as the control sample. Indirectly determined RTI ratings are verifiable by the UL® protocol UL746B. Due to the duration of the UL® protocol UL746B (which can take months), it is not always practical or possible to determine the Relative Thermal Index rating of a candidate resin sample by UL® protocol UL746B. Relative Thermal Index ratings indirectly obtained are preferably verified by the UL® protocol UL746B whenever practical.

The chlorine content of the polyetherimide can vary, depending on the application. The polyetherimide can have a chlorine amount of greater than 0 to 10,000 ppm, or, more specifically, greater than 0 to 4,000 ppm. In another embodiment, the polymer has a chlorine content of greater than or equal to 2,000 to less than 3,000 ppm. In another embodiment, the polymer has a chlorine content of greater than or equal to 1,000 to less than 2,000 ppm. In another embodiment, the polymer has a chlorine content of greater than 0 to less than 1,000 ppm.

In one embodiment, the polymer has advantageous flame retardant properties. The polyetherimide, for instance, has a flame retardant rating of V0 at 1.5 mm in one embodiment. In another embodiment, the polyetherimide has a flame retardant rating of V0 at 0.8 mm.

The polyetherimide generally has an OH content that is greater than 0 and less than or equal to 100 ppm. Advantageously, when the OH content of the polyetherimide is within this range, the polyetherimide exhibits a Relative Thermal Index that is greater than or equal to 170° C.

The polyetherimide of Formula (I), (II) or (III) is generally made by a process that involves contacting, in o-dichlorobenzene or anisole as diluent, substantially equimolar amounts of a disodium salt of a dihydroxy compound of formula HO—R'—OH, and a slurry of a bisimide, in the presence of a catalytically active amount of a phase transfer catalyst, thereby polymerizing the bisimide and the disodium salt;

wherein the bisimide and the disodium salt are polymerized in the presence of a base selected from the group consisting of alkali metal carbonates, alkyl hydrides, alkali metal hydroxides, alkali metal phosphates, alkali metal bicarbonates, alkali metal acetates, and combinations thereof;

wherein said slurry of bisimide comprises the reaction product of a mixture comprising a diamine of formula $H_2N$—R—$NH_2$; chlorophthalic anhydride; optionally phthalic anhydride; and o-dichlorobenzene or anisole; and an optional imidization catalyst, said mixture having a solids content of greater than or equal to about 5% by weight;

wherein the base is added in an amount that is sufficient to produce the polyetherimide.

The phase transfer catalyst can be any phase transfer catalyst which, when added in accordance to the process, is sufficiently thermally stable to produce the polyetherimide having an OH group that is greater than 0 and less or equal to 100 ppm. Suitable phase transfer catalysts are selected from the group consisting of hexaalkylguanidium salts, tetralkyl or tetraaryl phosphonium salts (phosphonium salts), phosphazenium salts, alkyl pyridinium salts, bis alkyl pyridinium salts, biguanidiniium salts (biguanide salts), alkylimidazolium salts, benzimidazolium salts, N-alkyl-4-alkylaminopyridinium salts, and combinations thereof. The foregoing salts include the indicated cationic component of the salt as well as the anionic component of the salt, which can be selected from the group of chlorides, bromides, iodides, sulfates, phosphates, mesylates, tosylates, and the like, and combinations thereof.

The amount of the phase transfer catalyst varies, depending on the application. Generally, the amount of the phase transfer catalyst is greater than or equal to 0.5 mole %, with respect to the amount of bisphenol A disodium salt used in the polymerization reaction. In another embodiment, the amount of the phase transfer catalyst is 0.5 to 5 mole %, with respect to the amount of bisphenol A disodium salt used in the polymerization reaction.

The optional imidization catalyst catalyzes the conversion of amic acid functionality to cyclized imide functionality. Suitable imidization catalysts are known in the art; they include salts of organophosphorus acids, particularly phosphinates such as sodium phenyl phosphinate and heterocyclic amines such as 4-diaminopyridine. In some embodiments the imidization catalyst comprises sodium phenyl phosphinate. The amount of the imidization catalyst can vary. Generally, when used, the imidization catalyst is present in an amount that is greater than 0 and less than 2 weight percent, by weight of the polyetherimide.

The bisimide can be made by any suitable method. In one embodiment, the bisimide is made by reacting chlorophthalic anhydride and excess diamine or a stochoimetric amount of diamine.

In one embodiment, the process further comprises the addition of a capping agent. The capping agent can be any compound with greater than or equal to one substituent such that when the capping agent is used, the substituent reacts with an amine group, thereby "capping" the amine. Examples of suitable capping agents can be selected from the group consisting of chloropthalic anhydrides, phthalic anhydrides, substituted phthalic anhydrides, alkyl anhydrides, cyclic alkyl anhydrides, substituted aryl anhydrides, acyl alkyl halides, acyl aryl halides, aldehydes, ketones, esters, isocyanates, chloroformates, sulfonyl chlorides, and combinations thereof. The amount of the capping agent can vary. In one embodiment, for instance, the amount can be 1 to 2 mole equivalents, per mole equivalent of excess amine (e.g., reacted m-phenylenediamine) present in the system. Other excess amounts are possible.

The bases used in the method can be selected from the group consisting of alkali metal carbonates, alkyl hydrides, alkali metal hydroxides, alkali metal phosphates, alkali metal bicarbonates, alkali metal acetates, and combinations thereof.

In one embodiment, the alkali metal phosphate base is $K_3PO_4$. $K_3PO_4$ can be added in the form of solid or an aqueous solution. In one embodiment, when $K_3PO_4$ is added in an aqueous solution, the $K_3PO_4$ is dried with bisphenol A disodium salt or 1,3-bis[N-(4-chlorophthalimido)]benzene prior to addition to the slurry. Alternatively, aqueous $K_3PO_4$ can be added to a slurry containing bisphenol A disodium salt in an organic solvent, e.g., orthodichloro benzene, and dried. In another embodiment, when the $K_3PO_4$ is added as a solid, the $K_3PO_4$ added has a particle size of greater than 0 to 400 microns (micrometers). In another embodiment, the $K_3PO_4$ added has a particle size of greater than 0 to less than 75 microns.

The slurries/mixtures formed during polymerization are generally anhydrous such that there can be less than 20 ppm water present in the system, as measured in the distillate from the polymerization vessel.

The amount of base used can vary. Generally, the amount of the base is greater than 0 weight percent, based on the weight of the polymer, and is present in a sufficient amount to enable the production of a polyetherimide having an OH content that is greater than 0 and less than or equal to 100 ppm and has an RTI rating that is greater than or equal to 170° C. Specific amounts will vary, depending on the base that is actually used, equipment used, how the base is introduced into the bisphenol A disodium salt, and other factors. In one embodiment, the amount of the base used during polymerization is greater than 0 to 2 weight percent, based on the weight of the polymer. In another embodiment, the amount of the base used during polymerization is greater than 0 to 1 weight percent, based on the weight of the polymer. In another embodiment, the amount of the base used during polymerization is 0.5 or more to 1.5 weight percent, based on the weight of the polymer.

The base is ordinarily added after the bisphenol A disodium salt has been combined with the slurry of 1,3-bis[N-(4-chlorophthalimido)]benzene in the presence of the hexaalkylguanidinium chloride phase transfer catalyst.

Other methods of addition, however, are possible. The base, for instance, can be added to the bisphenol A disodium salt before the bisphenol A disodium salt is combined with the slurry of 1,3-bis[N-(4-chlorophthalimido)]benzene in the presence of the hexaalkylguanidinium chloride phase transfer catalyst. When the alkali metal hydroxide is sodium hydroxide, the sodium hydroxide is preferably added to the bisphenol A disodium salt in an aqueous solution, then dried to provide a BPA (bisphenol-A) disodium salt slurry in an organic solvent, where the amount of excess sodium hydroxide is greater than 0 and less than 0.5 weight percent, based on the weight of the polymer to be prepared from the use of the BPA disodium salt, preferably at 0.1 to 0.2 weight percent. In one embodiment, when sodium hydroxide is used, the bisphenol A disodium salt has excess sodium hydroxide and is caustic rich. The skilled artisan, however, will appreciate that other variations are possible.

In one embodiment a polyetherimide having the structure of Formula (III):

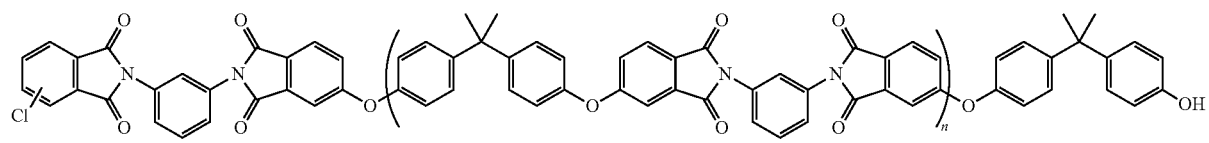

(III)

wherein the polyetherimide has an OH content that is greater than 0 and less than or equal to 100 ppm;

wherein the polyetherimide has a Relative Thermal Index that is greater than or equal to 170° C.; and wherein the polyetherimide has an chlorine content that is greater than 0 ppm;

wherein the polyetherimide is made by a method comprising contacting, in o-dichlorobenzene or anisole as diluent, substantially equimolar amounts of bisphenol A disodium salt and a slurry of 1,3-bis[N-(4-chlorophthalimido)]benzene, in the presence of a catalytically active amount of a hexaalkylguanidinium chloride as a phase transfer catalyst, thereby polymerizing the 1,3-bis[N-(4-chlorophthalimido)] benzene and the bisphenol A disodium salt; wherein the 1,3-bis[N-(4-chlorophthalimido)]benzene and the bisphenol A disodium salt are polymerized in the presence of a base selected from the group consisting of alkali metal carbonates, alkyl hydrides, alkali metal phosphates, alkali metal bicarbonates, alkali metal hydroxides, alkali metal acetates, and combinations thereof;

wherein said slurry of 1,3-bis[N-(4-chlorophthalimido)] benzene comprises the reaction product of a mixture comprising m-phenylenediamine; 4-chlorophthalic anhydride; optional phthalic anhydride; and o-dichlorobenzene or anisole; and an optional imidization catalyst, said mixture having a solids content of greater than or equal to about 5% by weight;

wherein the base is added in an amount that is sufficient to produce the polyetherimide having the OH content described above.

Also disclosed herein are compositions comprising the polyetherimde described herein having an RTI of 170° C. or more and a different polymer. Examples of polymers that can be combined with the polyetherimide of Formula (I), (II), or (III) can be selected from the group consisting of polyesters, polycarbonates, polyolefins, polysulfones, polyphenylene sulfides, polyetheretherketones, polyethersulfones, polyamides, polyamideimides, polyimides other than the polyetherimide having an OH group content of greater than 0 and less than or equal to 100 ppm, and combinations thereof.

The amounts of such additional polymers can vary, depending on the application. Generally, the amount of the other polymer can be 1 to 99 weight percent of the composition. For instance, a composition can comprise 50 to 99 weight percent of the polyetherimide having an OH content that is greater than 0 and less than or equal to 100 ppm and 1 to 50 weight percent of the polymer, wherein weight percent is based on the total weight of the composition. In other embodiments, the amount can vary.

Compositions containing the polyetherimide having an OH group content that is greater than 0 and less than or equal to 100 ppm and another polymer may further comprise an additive or combination of additives. Exemplary additives include electrically conductive fillers, reinforcing fillers, stabilizers, lubricants, mold release agents, inorganic pigments, UV absorbers; antioxidants, plasticizers; anti-static agents; foaming agents; blowing agents; metal deactivators and combinations comprising one or more of the foregoing. Examples of electrically conductive fillers include conductive carbon black, carbon fibers, metal fibers, metal powder, carbon nanotubes, and the like, and combinations comprising any one of the foregoing electrically conductive fillers. Examples of reinforcing fillers include glass beads (hollow and/or solid), glass flake, milled glass, glass fibers, talc, wollastonite, silica, mica, kaolin or montmorillonite clay, silica, quartz, barite, and the like, and combinations comprising any of the foregoing reinforcing fillers. Antioxidants can be compounds such as phosphites, phosphonites and hindered phenols or mixtures thereof. Phosphorus containing stabilizers including triaryl phosphite and aryl phosphonates are of note as useful additives. Difunctional or trifunctional phosphorus containing stabilizers with one or two phosphorous atoms can also be employed. Stabilizers may have a molecular weight greater than or equal to 300 Daltons. In some embodiments, phosphorus containing stabilizers with a molecular weight greater than or equal to 500 Daltons are useful. Phosphorus containing stabilizers are typically present in the composition at 0.05 to 0.5% by weight of the formulation. Flow aids and mold release compounds are also contemplated.

The reinforcing filler may be present in an amount less than or equal to 60 weight percent, based on the total weight of the composition. Within this range the reinforcing filler may be present in an amount greater than or equal to 10 weight percent, or more specifically, greater than or equal to 20 weight percent. Also within this range the reinforcing filler may be present in an amount less than or equal to 50 weight percent, or, more specifically, less than or equal to 40 weight percent.

Compositions comprising a polyetherimide having an RTI rating of greater than or equal to 170° C. and another polymer may be made by blending the compositions in an extruder. The polyetherimides described herein can also be formed, shaped, or molded into articles using thermoplastic processes such as shaping, film and sheet extrusion, injection molding, gas-assist injection molding, extrusion molding, compression molding, blow molding, and the like. The resulting articles may, for example, be in the form of a film (e.g., a solvent cast film for an overmolded article), sheet, molded object or fiber.

The invention is further described in the following illustrative examples in which all parts and percentages are by weight unless otherwise indicated.

EXAMPLES

Examples 1-54

In the following examples the polyetherimide produced was tested for the hydroxyl end group content by derivatization with a phosphorylation reagent, followed by phosphorous 31, Nuclear Magnetic Resonance (P31 NMR). The Relative Thermal Index (RTI) rating of the polyetherimide was determined by the "Accelerated Heat Aging Testing Method," or "Underwriter's Laboratory UL® Relative Thermal Index Test Method UL746B, further described below. Molecular weight of the polyetherimides produced in the examples was determined by gel permeation chromatography (GPC) using a Polymer Laboratory Mixed Bed C column, methylene chloride as eluent, and polystyrene narrow standards to determine the Mp (Peak Molecular Weight), Mn (Number Average Molecular Weight), and Mw (Weight Average Molecular Weight of the material.

Techniques & Procedures

Underwriter's Laboratory (ULC) Relative Thermal Index Test: Control polyetherimide and inventive polyetherimides discussed in Example 19 and 20 were measured by the following UL® RTI test. The Relative Thermal Index (RTI) rating of a resin is a value certified by Underwriting Laboratories (ULC) that relates to the long-term performance of materials employed at high temperatures. The RTI rating is measured using the protocol UL746B, and it is defined as the temperature at which a material holds 50% of tensile strength after 100,000 hours.

Molded samples of a control material (a polyetherimide made from bisphenol A dianhydride and metaphenylene diamine, commercial grade ULTEM™ 1000/1000 (referred to as "NDU" mentioned in FIG. 1), with a previous RTI rating established by the above-described UL protocol UL 746B and a sample of inventive polyetherimide (referred to as "CDU" in the Figure) were placed in ovens at controlled temperatures. Periodically, specimens were retrieved and tested, plotting the retention of the following properties versus time: (i) mechanical strength, (ii) impact, (iii) electrical, and (iv) flammability. An example of the results can be seen in FIG. 1. To obtain an RTI rating for a resin, a 4-point UL® program was required, where specimens are aged at 4 different temperatures until they lost 50% of the starting value of certain property.

Figure 2:
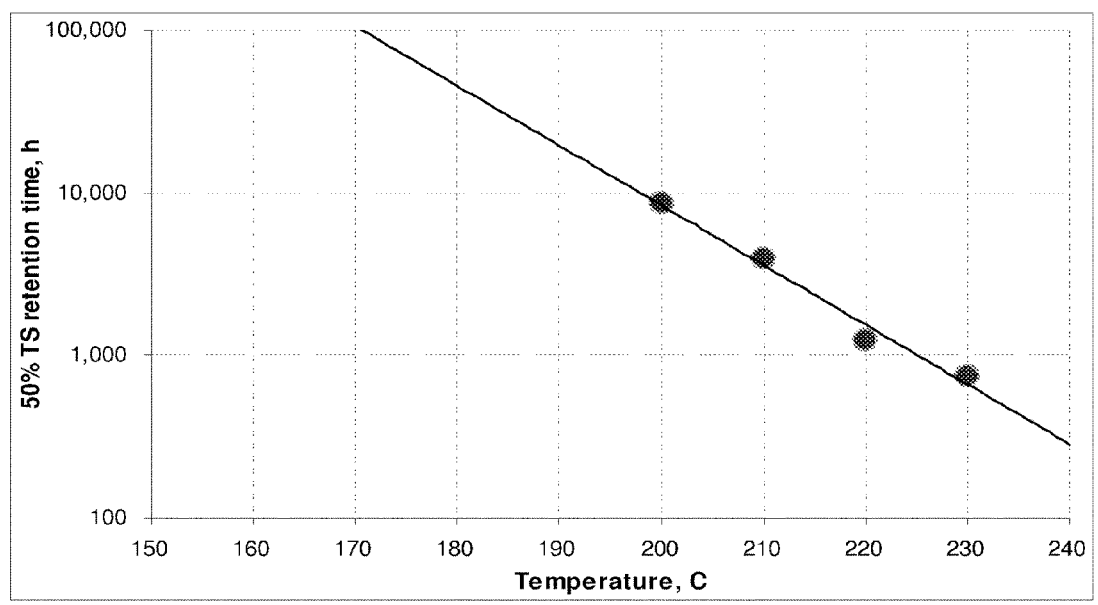
FIG. 2 is a graphical representation of RTI extrapolation.
Figure 3:
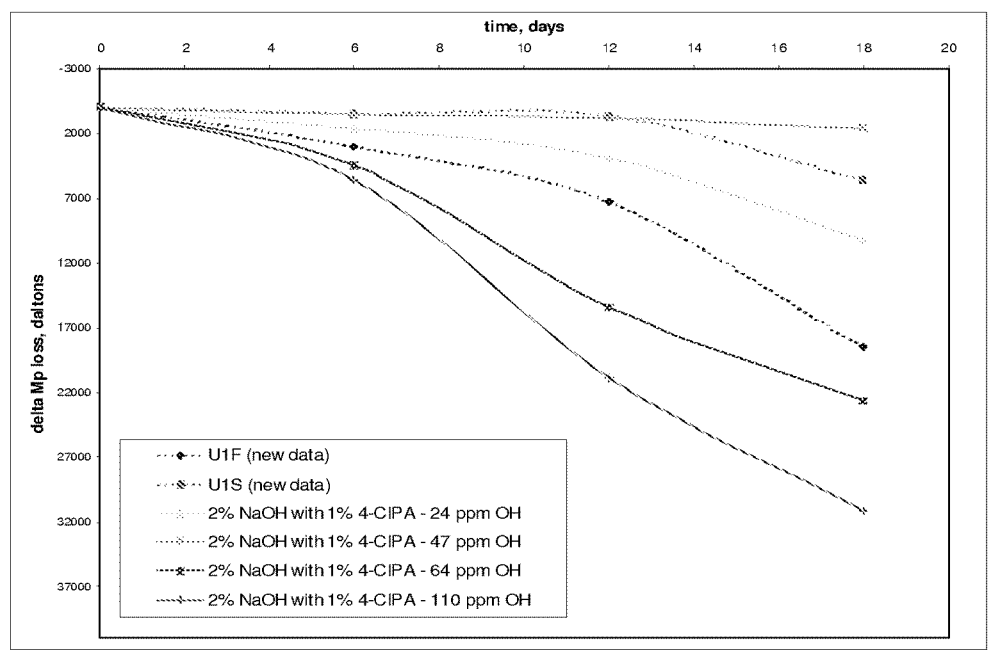
FIG. 3 is a graphical representation of data from the examples.

Due to the long time scale of the UL test, the RTI rating was obtained by extrapolation from property retention data obtained at higher temperatures. For each temperature that was evaluated, the 50% Property Retention (PR) time was obtained, and then the set of data was plotted in a semi logarithmic graph. In the 4-point UL® program, the RTI rating was calculated from the extrapolation of the linearly regressed data to 100,000 hours, as it can be seen in FIG. 2.

In order to correlate test results with existing materials, all RTI candidate testing was performed side by side with a previously RTI rated control sample that served as a reference to compensate for variations in parameter calibrations and measuring errors. The RTI rating for a candidate resin material was determined based on the performance of the control material in the side by side study, so the difference between the calculated RTI temperatures of the candidate and the control was either added or subtracted to the previously determined RTI rating of the control material. The control material was validated by UL®, verifying that its Dynamic Scanning calorimetry (DSC), Thermogravimetric Analysis (TGA) and Fourier-Transform Infrared Spectroscopy (FTIR) responses match the ones from the material used to confer the RTI rating for such grade.

Accelerated Heat Aging Testing Method:

The Accelerated Heat Aging Testing method involved heating resin samples (parts, pellets or powder form) in a forced heated air oven at 230° C. for up to 24 days. The air used in the oven was ambient air. The samples were pulled from the oven around day 6, 12, 18, and 24. Commercially available ULTEM™ 1000/1000 grade samples with <10 ppm OH ends, made from bisphenol A dianhydride and metaphenylene diamine and which has been verified to have a RTI rating of 170° C. by Underwriters Laboratories, were heat aged at the same time as the experimental resins. (ULTEM is a Trademark of SABIC Innovative Plastics IP B.V.)

The heat aged samples were then analyzed by GPC to determine the number average molecular weight (Mn), the weight average molecular weight (Mw), and the peak molecular weight (Mp). The samples that were heat aged in the UL RTI test were also analyzed by GPC. The molecular weight degradation (as measured by Mp, Mn, and Mw) of the inventive polyetherimide was compared with the molecular weight degradation of the commercially available ULTEM™ 1000/1000 grade samples.

A correlation was developed between the time a resin failed the UL test (time the specimen lost 50% of its tensile strength) and rate of Mp decline. If the percent peak molecular weight degradation of an experimental sample was within 10% of the percent peak molecular weight degradation of the control sample, then the Relative Thermal Index of the experimental sample is said to have the same Relative Thermal Index of the control sample. For example, if the peak molecular weight (Mp) drop of a control sample is 8%, then a resin with less than or equal to 18% Mp drop would have the equivalent RTI rating as the control sample. Whenever practical and possible, we verified results obtained from the Accelerated Heat Aging Testing Method with the UL746B protocol.

Examples 1-9

Examples 1-9 explored the effect of the presence of different bases during polymerization on the hydroxyl end group content of the polyetherimide. The following examples involved polymerization of bisphenol A disodium salt and 1,3-bis(N-(4-chlorophthalimido))benzene (ClPAMI) in the presence of a hexaethylguanadinium chloride (HEGCl) catalyst. All polymerization reactions were performed in orthodichlorobenzene (ODCB). Reactions were performed on a laboratory scale.

The bisphenol A disodium salt was isolated and prepared as follows. A 1 liter (L), round-bottomed flask was charged with a slurry of bisphenol A disodium salt in orthodichlorobenzene (ODCB). The ODCB was removed by means of a rotary evaporator (150° C., full (<10 mm) vacuum). After most of the ODCB had been collected, the temperature of the oil bath was increased to 160° C. and the salt allowed to dry further at full (<10 mm) vacuum for 3 hours. After cooling to room temperature, the flask was filled with nitrogen gas ($N_2$), detached from the rotavap and placed in a vacuum oven for 3 days (130° C., full (<10 mm) vacuum). The oven was cooled and the flask immediately transferred to a glovebox inerted with nitrogen. The solid disodium salt was stored under $N_2$ inside the glovebox.

The ClPAMI was isolated and prepared as follows. A sample of ClPAMI slurry in ODCB was filtered using a Buchner funnel. The solids were sequentially washed with warm ODCB (3 times, 80° C.) and hexanes at room temperature (3 times). After allowing to air dry for 1 hour, the solids were transferred to aluminum pans, covered with aluminum foil and dried in an oven under full vacuum (160° C., 3 days). The dried ClPAMI was stored inside a glovebox.

The polymerization was run and the polymer was isolated as follows. Inside a glovebox an oven-dried, 250 milliliter (mL), 4-necked, round-bottomed flask equipped with a septa for nitrogen inlet (other necks were capped with a stopper) was charged with a base (150 milligrams [mg], 1% by weight with respect to the final polymer), bisphenol A disodium salt (6.675 grams (g), 24.517 millimoles (mmol)), and 1,3-bis(N-(4-chlorophthalimido))benzene (ClPAMI, 11.070 g, 25.318 mmol). To this mixture was added 150 g of ODCB. The flask was taken out of the glovebox and assembled with a Dean-Stark trap/condenser and mechanical stirrer. The mixture was allowed to reflux with stirring (oil temp was kept at 200° C.). During this stage, ODCB started to collect in the Dean-Stark trap. After removing approximately 75 milliliters (mL, 90 g) of ODCB, HEGCl (330 mg of 20 weight percent in ODCB, 0.245 mmol of HEGCl) was added. Nitrogen flow was increased to hasten the overhead collection of ODCB until 30% solids was obtained. The mixture was allowed to stir and sampled for GPC analysis every hour. When the Mw standard deviation of the last three hourly samples was <500 Daltons (Da) the mixture was diluted with ODCB to 10% solids. The oil temperature was lowered to 165° C. followed by the addition of 5 drops of 85 weight percent aqueous $H_3PO_4$. After 30 minutes, the mixture was allowed to cool to room temperature and diluted with dichloromethane (75 mL) and filtered through a Buchner funnel The filtrate was slowly added to a blender containing 250 mL hexanes. The precipitate was homogenized, filtered and rinsed with hexanes (2×100 mL).

The white solid was dried under vacuum (<10 mm, 165° C.) for greater than or equal to 12 hours.

The hydroxy end group content of the polymers produced with the different bases is shown in Table 1. The "*" indicates a comparative example.

TABLE 1

| Example | Base | Hydroxy end group content (ppm) | RTI** (° C.) |
|---|---|---|---|
| 1* | No base | 302 | 160 |
| 2 | $K_2CO_3$ | 8 | 170 |
| 3* | NaH | 205 | 160 |
| 4 | $NaHCO_3$ | 25 | 170 |
| 5 | $K_3PO_4$ | 13 | 170 |
| 6 | K Acetate | 46 | 170 |
| 7* | Na tert-BuO | 329 | 160 |
| 8* | $Na_3PO_4 \cdot 12H_2O$ | 890 | < or = 160 |
| 9* | NaOH | 265 | 160 |

**Determined by the Accelerated Heat Aging Testing Method

These examples show that not all bases result in the reduction of the hydroxy end groups of the polymer. Surprisingly, stronger bases, such as NaH and NaOH were unsuccessful in reducing the hydroxyl end group content. Anhydrous $Na_3PO_4$ gave similar results to those shown above for the hydrated version.

Examples 10-12

Examples 10-12 explored the effect of the point of addition for the base on the hydroxyl end group content of the polyetherimide. $K_3PO_4$ was used as the base. Base was added to the bisphenol A disodium salt, to the ClPAMI slurry and during polymerization.

The following examples involved polymerization of bisphenol A disodium salt and 1,3-bis(N-(4-chlorophthalimido))benzene (ClPAMI) in the presence of a hexaethylguanadinium chloride (HEGCl) catalyst. The ClPAMI was rich in 4-monoamine. On stoich, and amine rich ClPAMI perform equally well in the polymerization reaction with bisphenol A disodium salt. All polymerization reactions were performed in orthodichlorobenzene (ODCB). Reactions were performed on a laboratory scale as described above.

The bisphenol A disodium salt was isolated and prepared as described above in Examples 1-9.

The ClPAMI was rich in 4-monoamine (4-MA) was prepared as follows. A 3-necked, round-bottomed flask was charged with m-phenylene diamine (2.743 g, 25.365 mmol), 4-chlorophthalic anhydride (4-ClPA) (9.225 g, 50.531 mmol), sodium phenylphosphinate (12 mg, 0.0731 mmol) and ODCB (65 g). The flask was assembled with a mechanical stirrer, a Dean-Stark trap and a nitrogen inlet and placed in pre-heated oil bath (170° C.). The mixture was stirred and the oil temperature was increased to 180° C. Nitrogen flow was gradually increased to allow a steady collection of water/ODCB mixture in the Dean-Stark trap. Nitrogen flow was decreased when approximately 10 ml of ODCB has been collected in the trap. The mixture was allowed to stir until no further change in residual 4-ClPA and 4-MA (final residual content: 0.4-0.7 mol % 4-MA and 0.00-0.02 mol % 4-ClPA, as determined by HPLC analysis). The mixture was kept at 180° C. under $N_2$ and was ready for polymerization.

The polymerizations were run as described above in Examples 1-9 with the following differences regarding the location of the base addition. In example 10 powdered bisphenol A disodium salt was combined with powdered $K_3PO_4$. The solids were quantitatively transferred to the flask containing the ClPAMI slurry. In Example 11 powdered $K_3PO_4$ was added to a flask containing a ClPAMI slurry. The mixture was stirred for greater than or equal to 1 hour at 180° C. under nitrogen. Powdered bisphenol A disodium salt was added to the mixture. Samples of the reaction mixture were pulled hourly and analyzed by GPC.

In Example 12 $K_3PO_4$ was added to the polymerization reaction when the molecular weight standard deviation of the last three hourly samples (last 3 hours) was <500 Daltons. When the Mw standard deviation of the last three hourly samples (last 3 hours) was <500 Da, the mixture was diluted with ODCB to make 10% solids.

The hydroxy end group content of the polymers produced with the different methods of $K_3PO_4$ base addition is shown in Table 2 below. Molecular weight of the polymers and the time for the polymer to achieve maximum molecular weight (time for the reaction to "plateau") is also shown. The results show that the location of the base addition does not have a significant impact on the hydroxyl end group content.

Example 13

Example 13 explored the use of an aqueous solution of $K_3PO_4$ instead of solid $K_3PO_4$. The bisphenol A disodium salt was isolated and prepared as described above in Examples 1-9.

The ClPAMI was rich in 4-monoamine was prepared as described in Examples 10-12.

A 3-necked, round-bottomed flask equipped with a magnetic stir bar and a means for N2 inlet was charged with bisphenol A disodium salt (6.675 g, 24.518 mmol) and dry ODCB to make 20% solids. The flask was assembled with a Dean-stark trap and heated with stirring at 120° C. To this mixture was slowly added aqueous $K_3PO_4$ (375 mg, 40% aq). The slurry was mixed and enough ODCB was slowly distilled until 25% solids are obtained. The mixture was allowed to stir for greater than or equal to 12 hours. The mixture was cooled but kept stirring under a slow $N_2$ flow. This slurry was ready for polymerization. The bisphenol slurry was quantitatively transferred to the flask containing the ClPAMI slurry. The mixture was heated to reflux and was stirred and nitrogen flow was increased to hasten the overhead collection of ODCB until 30% solids was obtained. At this stage, hexaethylguanadinium chloride (HEGCl, 790 mg, 8.3% in ODCB) was added and the reaction was allowed to proceed. The mixture was stirred and sampled for GPC analysis every hour. When the weight average molecular weight (Mw) standard deviation of the last three hourly samples was <500 Daltons (Da) the mixture was diluted with ODCB to make 10% solids. The polymer was quenched and isolated as described in Examples 1-9.

The hydroxy end group content of the polymer produced is shown in Table 2 below. Molecular weight of the polymer and the time for the polymer to achieve maximum molecular weight (time for the reaction to "plateau") is also shown. The results show that aqueous $K_3PO_4$ can be used to make a polyetherimide with low hydroxyl end group content.

TABLE 2

| Example | Mode of addition 1% $K_3PO_4$ | Mw final, kiloDaltons | Time to plateau (hours) | Hydroxy end group content ppm | RTI (° C.) |
|---|---|---|---|---|---|
| 10 | Powder, mixed with salt | 68.9 | 15 | 9 | 170** |

TABLE 2-continued

| Example | Mode of addition 1% $K_3PO_4$ | Mw final, kiloDaltons | Time to plateau (hours) | Hydroxy end group content ppm | RTI (° C.) |
|---|---|---|---|---|---|
| 12 | Powder, added on plateau | 64.0 | 16 | 3 | 170** |
| 11 | Powder, added to ClPAMI | 66.2 | 10 | 10 | 170** |
| 13 | 40% aq, added to salt, dried | 66.5 | 20 | 11 | 170** |

**Determined by the Accelerated Heat Aging Testing Method

Examples 14-17

Examples 14-17 explored the effect of $K_3PO_4$ particle size on hydroxyl end group content of the polyetherimide and the speed of the polymerization reaction.

The $K_3PO_4$ was fractionated into different particle sizes as follows. A weighed amount of $K_3PO_4$ (100 g, Acros) was placed in a 250 ml glass beaker and covered with an aluminum foil. The beaker was then placed in preheated vacuum oven (150° C.) and subjected to full vacuum over 3 days. The oven temperature was lowered to room temperature and the beaker taken out and transferred to a dry box with a continuous $N_2$ flow. Inside the dry box was placed a prearranged stainless sieving pans (arranged from top to bottom in microns: 850. 425. 250. 150, 75). The $K_3PO_4$ was poured on top and sieving pans shaken until no further materials are passing through (~5 hours). The powders were collected and kept inside the glove box.

The fractionated $K_3PO_4$ was used in polymerizations conducted according to Example 10 or 12. The hydroxy end group content of the polymer produced is shown in Table 3.

TABLE 3

| Example | Particle size distribution of $K_3PO_4$ (microns), added at 1% | Mw final, kiloDaltons | Time to plateau (hours) | Hydroxy end group content ppm | RTI** (° C.) |
|---|---|---|---|---|---|
| 14 | <75, added as described in Example 10 | 50.0 | 8 | 23 | 170 |
| 15 | <75, added as described in Example 12 | 50.4 | 10 | 30 | 170 |
| 16 | 150-250, added as described in Example 12 | 49.1 | 17 | 0*** | 170 |
| 17 | 75-150, added as described in Example 12 | 50.1 | 15 | 16 | 170 |

**Determined by the Accelerated Heat Aging Testing Method
***not detectable - less than 10 ppm The data shows that the particle size of the $K_3PO_4$ affects the speed of the polymerization reaction with smaller particle sizes correlating to faster polymerization reactions.

Examples 18-21

Examples 18-21 explored the use of $K_3PO_4$ during polymerization in large scale reactions (pilot plant scale) to reduce the quantity of hydroxy end groups on the polyetherimide. In Example 18, the importance of particle size when using $K_3PO_4$ was evaluated. Examples 19-20 illustrate successful trials using finely divided $K_3PO_4$. Example 21 illustrates the use of aqueous $K_3PO_4$, utilizing amine-rich ClPAMI and capping of amine groups, thereby resulting in low OH material. The RTI rating for the control material and the polyetherimides used in Example 19 and 20 was determined in accordance to the UL® Relative Thermal Index test method UL746B. The results of Examples 18-21 are summarized below. Examples 18 to 21 demonstrate the preference to run the polymerization reaction under strict anhydrous conditions and with finely divided base and/or finely divided bisphenol A disodium salt.

The bisphenol A disodium salt was prepared as follows. A 350-gallon (the first vessel), baffled, steam-jacketed stainless steel reactor, equipped with an agitator, a steam jacket, temperature indication, appropriate fittings for charging materials, a nitrogen inerting system, and an overhead line with condenser, was charged with 474 kilograms (1045 pounds) of water, and 191 kilograms (422 pounds, 839 moles) of bisphenol A (BPA). The mixture was stirred and inerted with nitrogen for 1 hour. The mixture was heated to 50° C. centigrade over a 1-hour period. The vessel was then charged with 134 kilograms (295.9 pounds, 1678 mol) of 50% sodium hydroxide (NaOH) with stirring. The mixture was then heated to 90 to 92° C. over one hour to effect dissolution of the bisphenol A as disodium salt. The solution was stirred for 1 hour at this temperature and then sampled. The material was stoichiometrically balanced (less than or equal to 0.1 mol % rich in NaOH).

A 500-gallon, baffled, insulated stainless steel reactor (also referred to as the salt dryer or the second vessel), equipped with temperature indication, means to maintain a strict nitrogen atmosphere, a pump around loop that included a variable speed pump and an oil-jacketed spiral heat exchanger, and an overheads line with a condenser, was charged with 977 kilograms (2150 pounds) of ODCB. The recirculation loop was equipped with a back-pressure control valve on the discharge of the reboiler. The ODCB was brought to 150° C. under nitrogen using hot oil on the heat exchanger. The aqueous mixture of bisphenol A disodium salt was sprayed into the ODCB at 1.8-3.1 kilograms per minute (4 to 7 pounds per minute) with 22 psig back-pressure maintained on the reboiler. This prevented boiling in the reboiler itself. The motive force to transfer the aqueous salt in the first vessel to the salt dryer was nitrogen pressure. The pump was set to provide 250 grams per minute (gpm) of flow through the recirculation loop. The oil was maintained at 218° C. Water and ODCB distilled, condensed, and collected in a decanter. The water was drawn off the decanter, and the ODCB was recirculated back to the salt dryer. The overheads stream of the reactor (prior to the condenser) was periodically collected and analyzed for moisture. This was accomplished by opening a valve on the overheads line to allow the vapor to enter an externally cooled coil. The condensed vapor was collected in a dry jar at the end of the coil, and then analyzed for water by Karl Fischer titration. After 680 kilograms (1500 pounds) of ODCB had been collected the moisture content in the overheads was <20 ppm water. An additional 227 kilograms (500 pounds) of ODCB was distilled off the second reactor and the oil was then valved out of the reboiler to afford a dry slurry of bisphenol A disodium salt in ODCB at 24.0% solids. The salt was cooled to ambient temperature with cold oil on the reboiler.

A portion of the dry bisphenol A disodium salt slurry (29.2 kg of 24% solids slurry, 7.18 kg, 26.37 mol of dry weight bisphenol A disodium salt) was charged to a third vessel. The third vessel was a 50-gallon oil-jacked stainless steel reactor equipped with an agitator, baffles, means for maintaining a nitrogen atmosphere, and an overheads line equipped with a condenser. The slurry was diluted with enough ODCB to provide a 10% solids slurry. Hot oil was circulated on the jacket of the vessel to distill a small amount of ODCB overhead in an attempt to dry the system. Where a base was added, potassium phosphate (finely ground) was used. The slurry was refluxed gently for 10 hours with stirring under nitrogen.

The ClPAMI was prepared as follows. In a fourth vessel, namely a 50-gallon, glass-lined, oil-jacketed, baffled reactor, equipped with a mechanical agitator, means for maintaining a nitrogen atmosphere, appropriate fittings for charging raw materials, and an over-head line equipped with a condenser, was charged with 9.5227 kilograms (kg, 52.16 mol) of purified 4-chlorophthalic anhydride (4ClPA), containing 5% by weight 3-chlorophthalic anhydride, 100.8 g of phthalic anhydride (0.68 mol), 3.000 kg (27.74 mol) of metaphenylene diamine (mPD), 0.0110 kg (0.067 mol) of sodium phenylphosphinate, and 60 kg of orthodichlorobenzene (ODCB) at ambient temperature. The mixture was stirred and inerted with nitrogen for 1 hour. The mixture was then heated to an internal temperature of 140° C. over three hours and held at that temperature for 30 minutes. Water generated by the imidization and some solvent was distilled from the vessel and condensed. The reaction mixture was then heated to 180° C. over 2 hours and held at that temperature for one hour. The mixture was sampled to determine the purity of the ClPAMI monomer by HPLC (high pressure liquid chromatography) analysis. It was determined that the material was deficient in ClPA, and 9.8 grams (0.054 mol) of 4-chlorophthalic anhydride was then added to the reactor. The reaction was heated for another hour and re-sampled. The material was judged to be 'on stoichiometry', 0.19 mol % residual ClPA, 0.002 mol % residual monoamine (MA). The material was then concentrated to 23% solids by distilling ODCB from the vessel (% solids is defined as the weight of the ClPAMI monomer divided by the sum of the ClPAMI monomer and solvent). The distillate was analyzed for moisture by Karl Fischer titration and found to be <20 ppm when 23% solids was achieved in the vessel. A sample was taken of the reaction mixture and analyzed by HPLC to determine the amount of monoamide-acid (MAA) present. The reaction was judged complete as <0.1 mol % of MAA (mono amide acid) was observed.

The polymerization was run and the polymer isolated as follows. The bisphenol A disodium salt slurry in the third vessel was cooled and transferred to the fourth vessel (the 50-gallon reactor containing the ClPAMI slurry described above). The bisphenol A disodium salt and ClPAMI mixture were dried over the course of 10 hours by distilling ODCB overhead with the use of the hot oil jacket on the vessel to provide a slurry that was approximately 25% solids. The catalyst (HEGCl, 73.19 grams, 0.28 mol, dissolved in 292 grams of ODCB, moisture content of the catalyst solution was 20 ppm as determined by Karl Fischer titration) was then added to the slurry and the mixture was brought to reflux (180 to 185° C.) with the use of the hot oil jacket on the vessel.

When the polymer had attained the desired molecular weight as determined by GPC, the reaction mixture was cooled to 165° C. and treated with 85% aqueous $H_3PO_4$ (193 g, 1 weight percent with respect to the amount of polymer present) for 1 hour with stirring. The reaction mixture was then diluted with ODCB to provide a 10% by weight solution of polymer in ODCB and cooled to 120 to 135° C. The material was then filtered through a 2 microns sintered metal filter to remove the precipitated sodium chloride and phosphate salts to provide a clear amber solution of polymer in ODCB. The filtrate was collected in an oil-jacketed stainless vessel equipped with an agitator.

The polymer solution was then contacted with 329 kg of water at 90° C. The pH of the water had been adjusted to 4 to 5 with the addition of a small amount of $H_3PO_4$ prior to transfer to the vessel. The two-phase system was mixed for 5 minutes at 160 rpm, and then allowed to settle for two hours. The organic phase was drawn off to a separate identical vessel. The aqueous phase was discarded. The organic phase was again washed with 149 kilograms (329 pounds) of slightly acidic water as just described. The organic phase was then concentrated to 30% solids solution through the distillation of ODCB. The concentrated solution was then feed at 33 kilograms per hour (72 pounds per hour) to a devolatilizing vacuum extruder. The screw speed of the extruder was 525 rpm, the vacuum ports on the extruder barrel was maintained at 3 mm Hg, the melt temperature of the polymer was 430° C. The strands of polymer were cooled in a water bath, conveyed to a device to blow surface water from the strands, and then feed to a chopper to produce resin pellets. Specific conditions of the Examples 18-21 are discussed below.

Example 18

In Example 18 the $K_3PO_4$ was crushed and added to the bisphenol A disodium salt slurry and heated with mixing for ten hours at reflux (180° C.). When the bisphenol A disodium salt slurry with the $K_3PO_4$ was added to the ClPAMI slurry large particles (approximately 1 to 5 mm in size) were present in the resulting mixture that consisted primarily of $K_3PO_4$. The fact that the $K_3PO_4$ was not finally divided resulted in the isolation of polymer with 309 ppm OH end groups. It was later discovered that a small amount of water had entered the reactor where the bisphenol A disodium salt and the $K_3PO_4$ were heated, and agglomerated the $K_3PO_4$. The presence of the water is believed to have reduced the effectiveness of the $K_3PO_4$ (by agglomeration).

Example 19

In Example 19 the $K_3PO_4$ was used as received and contained water in an amount of 1% by weight and the introduction of moisture in the system during $K_3PO_4$ addition was avoided. The bisphenol A disodium salt and $K_3PO_4$ were heated and stirred at 180 C for 12 hours resulting in a finely divided slurry. Use of this material in the polyermization reaction resulted in low OH containing material (63 ppm OH).

Example 20

In Example 20 the $K_3PO_4$ was dried prior to use to achieve a water content of less than 100 ppm water. The bisphenol A disodium salt and $K_3PO_4$ were heated and stirred at 180 C for 12 hours resulting in a finely divided slurry. Use of this material in the polymermization reaction resulted in low OH containing material (25 ppm OH).

Example 21

Example 21 explored the use of aqueous $K_3PO_4$ in place of solid $K_3PO_4$ and the use of a capping agent to cap amine endgroups.

The bisphenol A disodium salt with $K_3PO_4$ was prepared as follows. The bisphenol A disodium salt was prepared as described in Examples 18-20. A 50-gallon oil-jacketed stainless steel reactor was charged with a slurry of bisphenol A disodium salt in ODCB where the % solids of the salt in the ODCB was 15% by weight (7.822 kg of bisphenol A disodium salt was present). The slurry was sparged with nitrogen for 70 minutes and then heated to 170° C. A 50 weight percent solution of potassium phosphate ($K_3PO_4$, 420.8 g of solution, 210.4 g, 0.99 mole) in water was sprayed into the hot ODCB mixture over 50 minutes. The spray was a fine spray of droplets that had an average size of 40 u. The spray was directed at surface of the material in the vessel. Water and ODCB flashed overhead and was condensed. The vessel was equipped with a bottom fitting plumbed to a centrifugal pump that discharged back to the vessel. The contents of the vessel were recirculated through the pump to effectively reduce the particle size of bisphenol A disodium salt and $K_3PO_4$ solids. The mixture was concentrated to ~20% by distilling ODCB overhead. The amount of moisture in the overheads as the material in the vessel was at 19.5% solids was 16 ppm. The vessel was cooled to 120° C. and stirred for 12 hours and then cooled to room temperature.

The ClPAMI was prepared as described in Examples 18-20 using following amounts: 4-ClPA (9.8769 kg, 54.10 mol), 3-ClPA (0.5045 kg, 2.76 mol), phthalic anhydride (PA, 4.9 grams, 0.033 mol), meta-phenylene diamine (mPD, 3.000 kg, 27.74 mol), SPP (11 gr, 0.067 mol) and 68.7 kg of ODCB. The final product was concentrated to 20% solids by distillation of ODCB. The final stoichiometry of the product was 0.33 mol % excess 4-MA (0.184 mol) and non-detectable amount of 4-ClPA. The mixture was cooled to ambient temperature.

The polymerization proceeded by combining the bisphenol A disodium salt slurry containing $K_3PO_4$ with the ClPAMI, drying the combined mixture by the distillation of a small amount of ODCB from the vessel, followed by addition of the polymerization catalyst (HEGCl, 75.8 gr, 0.287 moles in 300 mL of dry ODCB). An exothermic reaction ensued. The reaction ran at 180° C. for 6 hours and analysis (gel permeation chromatography, GPC) showed that the polymer had a Mw of 21,000 Daltons. An additional portion of the $K_3PO_4$ treated bisphenol A disodium salt slurry was then added to the vessel (387 gr, 1.42 mol) and the mixture was heated for another 6 hours at which time the Mw was 34,350 Daltons. An additional portion of the $K_3PO_4$ treated bisphenol A disodium salt slurry was then added to the vessel (105 g, 0.386 mol) and the mixture was heated for another 12 hours at which time the Mw was 46,930 Daltons. Phthalic anhydride (PA, 50 gram, 0.34 mol, 1.85 equiv with respect to the amount of 4-MA present in the starting ClPAMI mixture) was then added to the vessel to cap the free amine end-groups. The reaction was heated at 180° C. for another 3 hours. The polymer was then treated with phosphoric acid and isolated as described in Examples 18-20.

The resulting polymer had a molecular weight of 46,700 Daltons with a hydroxy end group content of 57 ppm and an amine end group content of 13 ppm, and an RTI rating of 170° C., as determined by the Accelerated Heat Aging Testing Method.

This example demonstrated the use of aqueous $K_3PO_4$ to treat the bisphenol A disodium salt, the use of a centrifugal pump to reduce the particle size of the salt particles, the importance of dryness of the polymerization reaction mixture, the ability to run a polymerization reaction amine rich followed by capping of the amines with PA, to ultimately provide a resin low in OH and $NH_2$ end content in a reasonable amount of time.

The results of Examples 18-21 are summarized below in Table 4.

TABLE 4

| Example | OH Content of Polymer (ppm by weight) | Peak Molecular weight drop after 12 days at 230° C. (% Mp Drop) | Accelerated Heat Aging Testing Method (° C.) | UL Test Protocol UL756B (° C.) |
|---|---|---|---|---|
| ULTEM ™ 1000/1000 | <10 | 8.5 | 170 | 170 |
| 18 (Comparative) | 309 | 35.0 | 160 | NM |
| 19 | 63 | 12.8 | 170 | 170 |
| 20 | 25 | 12.5 | 170 | 170 |
| 21 | 57 | 12.6 | 170 | NM |

NM: not measured

Example 22-49

Examples 22-40 explored the effect of the stoichiometry of the bisphenol A disodium salt on the quantity of hydroxyl end groups in the polyetherimide.

The bisphenol A disodium salts were prepared as follows. A 2-liter, 3-necked, round-bottomed flask was charged with the requisite amount of bisphenol A to prepare approximately 0.5 moles of aqueous disodium salt of the desired stoichiometry (see Table 5) at roughly 15% solids. The bisphenol A was weighed into the flask on a capable balance that was checked with standard weights just prior to weighing. The bisphenol A generally contained less than 400 ppm of water, and this error was neglected. The flask, along with degassed water, and a 1N Anachemia Acculute (part number 83112-000, containing 0.998 to 1.002 moles of NaOH) was placed in a glove box under nitrogen. A balance with a two decimal point capability was also in the glove box.

TABLE 5

| EXAMPLE | Standard (Stoichiometry Error in Mole %) | Delta moles BPA from perfect stoichiometry | Weight BPA (g) | Total weight std (g) | Weight solids (g) | Weight. 1.0N NaOH Acculute and $H_2O$ (g) |
|---|---|---|---|---|---|---|
| 22 | On stoichiometry BPA rich stds | 0 | 114.1450 | 907.53 | 136.13 | 793.39 |
| 23 | 0.3 | 0.0015 | 114.4874 | 909.82 | 136.47 | 795.33 |
| 24 | 0.5 | 0.0025 | 114.7157 | 911.34 | 136.70 | 796.62 |
| 25 | 0.6 | 0.003 | 114.8299 | 912.10 | 136.81 | 797.27 |
| 26 | 1 | 0.005 | 115.2865 | 915.14 | 137.27 | 799.86 |
| 27 | 2 | 0.01 | 116.4279 | 922.75 | 138.41 | 806.32 |
| 28 | 3 | 0.015 | 117.5694 | 930.36 | 139.55 | 812.79 |
| 29 | 5 | 0.025 | 119.8523 | 945.58 | 141.84 | 825.73 |
| 30 | 8 | 0.04 | 123.2766 | 968.41 | 145.26 | 845.13 |

TABLE 5-continued

| EXAMPLE | Standard (Stoichiometry Error in Mole %) | Delta moles BPA from perfect stoichiometry | Weight BPA (g) | Total weight std (g) | Weight solids (g) | Weight. 1.0N NaOH Acculute and H$_2$O (g) |
|---|---|---|---|---|---|---|
| BPA deficient stds | | | | | | |
| 31 | −0.2 | 0.001 | 113.9167 | 906.25 | 135.94 | 792.33 |
| 32 | −0.3 | 0.0015 | 113.8026 | 905.61 | 135.84 | 791.81 |
| 33 | −0.5 | 0.0025 | 113.5743 | 904.33 | 135.65 | 790.75 |
| 34 | −0.6 | 0.003 | 113.4601 | 903.69 | 135.55 | 790.23 |
| 35 | −1 | 0.005 | 113.0036 | 901.12 | 135.17 | 788.12 |
| 36 | −2 | 0.01 | 111.8621 | 894.72 | 134.21 | 782.85 |
| 37 | −3 | 0.015 | 110.7207 | 888.31 | 133.25 | 777.59 |
| 38 | −4 | 0.02 | 109.5792 | 881.90 | 132.28 | 772.32 |
| 39 | −5 | 0.025 | 108.4378 | 875.49 | 131.32 | 767.05 |
| 40 | −8 | 0.04 | 105.0134 | 856.26 | 128.44 | 751.25 |

The NaOH was carefully added to the flask and degassed water was used to complete the transfer of the caustic from the Acculute plastic bottle to the flask. The combined total weight of water and the contents of the Acculute bottle was approximately 800 grams. The flask was capped in the dry box and then transferred to a laboratory hood.

The flask was fitted with a mechanical stirrer, and a Dean and Stark receiver topped with a reflux condenser. The arm of the Dean and Stark fitted to the flask was wrapped with electrically heated tape. The third neck was fitted with a nitrogen adapter. A gentle of flow of nitrogen was established. The flask was then immersed in a temperature controlled oil bath that sat on a laboratory jack. The set-up was such that the oil bath could be lowered completely away from the bottom of the round-bottomed flask.

The mixture was stirred at room temperature until the bisphenol A dissolved. Bisphenol A rich salts periodically required gentle heating to effect dissolution of the bisphenol A. Degassed reagent grade toluene was added to the flask to the point that there was about one inch of head-space between the liquid level and the bottom of the side neck joint. The oil temperature was then taken to 145° C. Toluene and water distilled from the flask and the water collected in the arm of the receiver. The water was removed and not allowed to return to the flask. The bulk water was removed in this manner over a course of about 6 hours. Fresh degassed toluene was added after about two-thirds of the water had been removed. Very little water distilled over after six hours of reflux. Bisphenol A disodium salt agglomerated on the sides of the vessel. The heat was removed and the material cooled to room temperature overnight under nitrogen.

While maintaining nitrogen above the salt slurry, the sides of the flask and the stir shaft were carefully scraped with a large bent spatula. Once the caked-on salt was removed, the Dean and Stark receiver and nitrogen adapter were replaced in the original configuration. Degassed toluene was added to nearly fill the flask, but enough head space was left for vapor to exit. The vessel was placed back into the temperature controlled oil bath set at 145 to 150° C., and toluene/water was distilled overhead with a gentle nitrogen sweep, while allowing the toluene in the collection arm return to the vessel and drawing off the water that collected in the side arm. After 4 to 5 hours of reflux, the vast majority of the water had been removed and the toluene in the collection arm of the receiver was nearly clear. At this point, 1 liter of toluene was distilled overhead and withdrawn from the side arm (no toluene was allowed to flow back into the vessel). Approximately 500 mL of degassed bottled reagent grade toluene was added to the flask and distilled off until about 500 mL of slurry remained in the vessel.

The oil bath was removed from the vessel while maintaining a nitrogen sweep in the system. The material was allowed to cool. The vessel was capped and transferred to a glove box maintained under nitrogen. The slurry was then transferred to a 1-liter, 1-necked, round-bottomed flask.

The flask was then quickly placed on a rotary evaporator and vacuum was slowly established to 75 to 100 mm Hg. The flask was lowered into a temperature controlled oil bath set at 50 to 60° C. The bulk toluene was removed to afford dry salt. The flask was removed from the oil bath, and nitrogen back-added to the evaporator. The flask was removed and shaken to break up any cake. The vacuum traps and bulb receiver on the rotary evaporator were emptied, rinsed with acetone, blown dry, and replaced. The flask was again placed on the rotary evaporator and the flask placed under full vacuum (<25 mm Hg). The flask was heated in the oil bath set a 150° C. for one hour to afford dry free flowing solid bisphenol A disodium salt.

ClPAMI was synthesized as described in Examples 18-21. A portion of ClPAMI/ODCB slurry (2 kg) was cooled to room temperature. The slurry was vacuum filtered using a Whatman Number 1 filter paper on a large Buchner funnel to afford a wet cake. One liter of warmed ODCB (90° C.) was added to the cake in the filter. Vacuum was applied to remove this ODCB rinse. The rinse was repeated with another 1 liter of 90° C. ODCB. The wet cake in the funnel was then rinsed with 1 liter of room temperature toluene to remove the bulk of the ODCB from the cake. The cake was then placed in an aluminum pan. The pan was placed in a vacuum oven (10 mm) for 12 hours at 150° C. The pan was removed from the oven and allowed to cool to afford dry ClPAMI monomer.

Polymerizations were performed as follows. All charges were done in dry box with the glassware being assembled. A 250-mL, three-necked, round-bottomed flask equipped with a stopper and a gas valve were charged with 6.09 grams (0.0224 moles) of a particular stoichiometry bisphenol A disodium salt, and 10 grams (0.0228 moles) ClPAMI (prepared as described above). The flask was charge with 65 grams of ODCB. The flask was then equipped with a stir shaft and bearing. The flask was removed from the dry-box and immediately fitted with a nitrogen adapter on a side neck. The remaining stopper was allowed to float, venting any pressure. The vessel was then fitted with a Dean and Stark receiver topped with a reflux condenser. A gentle sweep of nitrogen was established through the head-space of the vessel. The reaction was then heated to 200° C. with the use of an external oil bath, and a gentle nitrogen sweep was established, to azeotropically dry the ODCB mixture. ODCB was removed from the mixture until it reached 30 weight percent solids (~25 grams of ODCB). The mixture was gently stirred to avoid splattering of the materials on the sides of the flask or on the stir shaft. Once the overheads were dry by Karl Fischer analysis, 90 mg (1 mole %) of HEGCl was charged to the solution; within 30 minutes the solution was brownish and finally a golden solution after 90 minutes. The mixture was sampled after 2 hours to measure Mw, and then every hour until the reaction had plateaued (plateau=last 3 hourly samples had a standard deviation of less than 500 Daltons). If the Mw was below 45K a correction of 140 mg of bisphenol A disodium salt was made to target a polymer Mw of 55,000.

The reaction was then heated at 160° C., then treated with 170 mg (1 weight % with respect to polymer) of 85% aqueous $H_3PO_4$. Once the acid was added the mixture was purged with nitrogen to remove any water (5 minutes). The reaction was heated for another hour. The reaction was then cooled and diluted to 10 weight percent with $CH_2Cl_2$ (approximately 70 mL). The mixture was then filtered on Buchner funnel using a Whatman 1 micrometer GF (glass filter) disk. The filtrate solution was then transferred to blender where an equal volume of hexane was added and blended, where upon the polymer precipitated from solution. The mixture was filtered and the isolated polymer was dried under vacuum at 165° C. for 24 hours to form a dry polymer powder.

The resulting polymers were analyzed for OH end content by P31 NMR. Results are shown in Table 6.

the amount of OH ends to a level that afforded polymer that heat aged well. Further, the polymers made in Example 41-49 showed elevated amine end groups.

Examples 50-52

Polymerizations were run as described above and were treated with 4-ClPA in two different modes. In one mode, 1 weight percent of 4-ClPA (with respect to the weight of polymer produced) was added to the polymerization reaction mixture 1 hour after the Mw build had ceased to build, at 180° C. The mixture was heated for 2 hours and then treated with phosphoric acid and isolated as described above. In the other mode, the polymerization mixture was quenched with phosphoric acid 1 hour after the Mw build had ceased to build, and then 1 weight percent of 4-ClPA (with respect to the weight of polymer produced) was added to the reaction mixture at 180° C. and stirred for 2 hours at 180° C. The polymers were then heat aged in the Accelerated Heat Aging Testing Method and the data is shown in Table 7.

TABLE 7

| Example | ClPA Capping Method | OH End Content (ppm) | RTI Rating (° C.) |
|---|---|---|---|
| 50 | before quenching with $H_3PO_4$ | 24 | 170 |

TABLE 6

| Example | Salt source | Catalyst amt | S/C ratio | Mw at Plateau | PDI | ppm Amine End Group | ppm OH End Group | RTI** |
|---|---|---|---|---|---|---|---|---|
| 41* | 1% BPA rich | 1.5 | 0.98/6.22 | 75402 | 2.97 | 55 | 1344 | 160 |
| 42* | on stoich | 1.5 | 0.98/6.22 | 46884 | 2.33 | 71 | 570 | 160 |
| 43* | 0.2% NaOH rich | 1.5 | 0.98/6.22 | 60949 | 2.74 | 62 | 496 | 160 |
| 44* | 0.3% NaOH | 1.5 | 0.98/6.22 | 55291 | 2.96 | 0 | 466 | 160 |
| 45* | 0.5% NaOH | 1.5 | 0.98/6.22 | 52187 | 2.39 | 93 | 512 | 160 |
| 46* | 1% NaOH | 1.5 | 0.98/6.2 | 75420 | 3.11 | 123 | 342 | 160 |
| 47 | 2% NaOH | 1.5 | 0.98/6.18 | 47410 | 2.9 | 111 | 55 | 170 |
| 48 | 3% NaOH | 1.5 | 0.98/6.22 | 45210 | 2.39 | 197 | 54 | 170 |
| 49 | 4% NaOH | 1.5 | 0.98/6.15 | 48830 | 2.17 | 89 | 62 | 170 |

*Comparative Example
**Determined by the Accelerated Heat Aging Testing Method

Discussion of Examples 41-49

The results show that only some polyetherimides had an OH content that was greater than 0 and less than or equal to 100 parts per million by weight (ppm); and a Relative Thermal Index that is greater than or equal to 170° C. The caustic rich salts that were 2% to 4% NaOH excess resulted in polymer with ~60 ppm OH end group content. The amine end-group composition was slightly elevated. The isolated polymers were heat aged in the Accelerated Heat Aging Testing Method and shown to heat age as well as resin with very low OH end content. Greater than or equal to 2 mol % excess NaOH rich bisphenol A disodium salt was necessary to lower TABLE 7-continued

| Example | ClPA Capping Method | OH End Content (ppm) | RTI Rating (° C.) |
|---|---|---|---|
| 51 | before quenching with $H_3PO_4$ | 47 | 170 |
| 52 | after quenching with $H_3PO_4$ | 64 | 170 |

Examples 53-56

The synergy of added $K_3PO_4$ and caustic rich salt to produce resin with <100 ppm OH was explored. Polymerizations were run as described above. BPA disodium salt was prepared that was 1 mole % rich in sodium hydroxide. This salt was rigorously dried and then polymerized with ClPAMI in the presence of 0.25 to 1.0 weight percent solid $K_3PO_4$ (with respect to the polymer weight produced) and a phase transfer catalyst (hexaethylguanidinium chloride, 1 mole % with respect to the amount of bisphenol A disodium salt). The amount of excess caustic used to make the BPA disodium salt was 0.12 weight percent with respect of the amount of polymer produced.

The results are shown in Table 8 below.

TABLE 8

Synergy of $K_3PO_4$ and 1 mol % Caustic Rich Disodium Salt (1)

| Example | Weight percent $K_3PO_4$ | weight percent excess NaOH | OH End Content (ppm) | RTI Rating** |
|---|---|---|---|---|
| 53 | 0.25 | 0.13 | 459 | 160 |
| 54 | 0.35 | 0.13 | 177 | 160 |
| 55 | 0.50 | 0.13 | 54 | 170 |
| 56 | 1.00 | 0.13 | 28 | 170 |

(1) Weight percent $K_3PO_4$ is with respect to the amount of polymer produced. Weight percent excess NaOH is with respect to the amount of polymer produced and equates to 1 mole % NaOH rich BPA disodium salt. The OH content was measured by P31 NMR. Studies have shown that polymer containing less than 100 ppm OH has an RTI of 170 C.
**As determined by Accelerated Heating Aging Testing Method

Alternative Examples

The purpose of these examples was to determine whether the use of stabilizers would improve the RTI properties of chloro-displaced polyetherimides. Inexplicably, as further discussed below, the use of the stabilizers did not result in chloro-displaced polyetherimides having an RTI of 170° C. or more.

More particularly, the use of stabilizers to address the thermal stability issues of polyetherimide resins having a hydroxyl end group content greater than 100 ppm was explored. These examples are all comparative and are named "alternative examples" to distinguish them from the preceding comparative examples.

Two different polyetherimide resins were used. One polyetherimide resin made from a chloro displacement process had a hydroxyl end group content of 350 ppm containing chlorine endgroups (Resin III), which was isolated from the initial reaction of ClPAMI and bisphenol A disodium salt in ODCB in the presence of a phase transfer catalyst and had an RTI rating of 160° C. The other polyetherimide was commercial grade ULTEM™ 1000-1000 material prepared from bisphenol A dianhydride, meta-phenylene diamine, and phthalic anhydride as described in U.S. Pat. No. 4,417,044 (assigned to SABIC Innovative Plastics), and had a hydroxyl end group content of <10 ppm, no chlorine end groups, and an RTI rating of 170° C.

Alternative Examples 1-15

The stabilizers listed in Table 9 were compounded into a polymer of Formula (III) containing 350 ppm OH endgroup content in the amounts shown. Amounts are in weight percent based on the total weight of the composition.

TABLE 9

| Alternative Example | Stabilizer | Amount (weight percent) | CAS | Supplier |
|---|---|---|---|---|
| 1 | Irgafos P-EPQ | 0.15 | 119345-01-6 | Ciba |
| 2 | Irganox 1010 | 0.30 | 98584-37-3 | Ciba |
| 3 | Irgaphos 168 | 0.30 | 31570-04-4 | Ciba |
| 4 | Doverphos S-9228 | 0.30 | 154862-43-8 | Dover Chem |
| 5 | Irganox 1330 | 0.15 | 1709-70-2 | Ciba |
| 6 | Irganox 1010 + Irgaphos 168 | 0.15/0.15 | | Ciba |
| 7 | Irgaphos169 + Phosphoric acid (2:1 mol) | 0.10 | | |
| 8 | Hycite 713 (DHT-4C) | 0.05 | 11097-59-9 | Ciba |
| 9 | DER 661 Epoxy | 0.30 | 25036-25-3 | Dow |
| 10 | Mono zinc phosphate (MZP) | 0.30 | 13598-37-3 | N/A |
| 11 | SAPP (Sodium dihydrogen pyrophosphate) | 0.30 | 7758-16-9 | N/A |
| 12 | Zinc oxide | 0.30 | 1314-13-2 | N/A |
| 13 | Sodium phenyl phosphenate (SPP) | 0.05 | 4297-95-4 | Ferro Corporation |
| 14 | Trisodium phosphate | 0.05 | 10101-89-0 | N/A |
| 15 | Phosphoric acid dipentyl ester sodium salt | 0.30 | 68698-62-4 | N/A |

Techniques & Procedures

The stabilizers were dry mixed with the polyetherimide having a hydroxyl end group content of 350 ppm and extruded on a 18 millimeter (mm) Coperion ZSK-18 Mega-Lab twin screw extruder (high-temperature version), with 12 barrels. The extruder had a feed in barrel number 1, a twin screw side feeder in barrel number 2, a vacuum vent in barrel number 11, a length to diameter ratio (L/D) of 48, and was fed by an adjustable rotatory screw feeder. The extruder was run under the following conditions shown in Table 10.

TABLE 10

| Extrusion Conditions | Set/Read |
|---|---|
| Zone 1 (Feed) | 600° C. |
| Zone 2 | 620° C. |
| Zone 3 | 640° C. |
| Zone 4 | 650° C. |
| Zone 5 | 660° C. |
| Zone 6 (Vac. Vent) | 670° C. |
| Zone 7 | 680° C. |
| RPM | 250 |

The isolated pellets were aged using the accelerated heat aging test at 230° C., using our previously described Accelerated Heat Aging Test Method. The peak molecular weight of the compounded pellets was measured before heat aging, after 6 days of aging and after 13 days of aging by gel permeation chromatography (GPC). The molecular weight of the polyetherimide having a hydroxyl end group content of 350 ppm prior to aging, after 6 days of aging and after 13 days of aging is shown for comparison. Similarly, the molecular weight of the polyetherimide having a hydroxyl end group content of <10 ppm prior to aging, after 6 days of aging and after 13 days of aging is also shown. The heat aging results are shown in Table 11.

TABLE 11

Peak Molecular Weight (Mp) of Compounded Resins Observed in the Accelerated Heat Aging Testing Method.

| Alternative Example | Stabilizer | days @ 230° C. | | | RTI* |
|---|---|---|---|---|---|
| | | 0 | 6 | 13 | |
| | Resin with <10 ppm OH(ULTEM ™ 1000-1000) | 49959 | 50859 | 49987 | |
| | Resin with 350 ppm OH(Resin III) | 50609 | 46306 | 36771 | 160 |
| 1 | Irgafos P-EPQ | 50136 | 46692 | 36899 | 160 |
| 2 | Irganox 1010 | 50417 | 43513 | 34698 | 160 |
| 3 | Irgaphos 168 | 50187 | 45998 | 36753 | 160 |
| 4 | Doverphos S-9228 | 49336 | 43590 | 34833 | 160 |
| 5 | Irganox 1330 | 50345 | 44278 | 34956 | 160 |
| 6 | Irganox 1010 + Irgaphos 168 | 50774 | 45796 | 38239 | 160 |
| 7 | Irgaphos169 + Phosphoric acid (2:1 mol) | 51023 | 45859 | 39750 | 160 |
| 8 | Hycite 713 (DHT-4C) | 51746 | 43725 | 32615 | 160 |
| 9 | DER 661 Epoxy | 50053 | 43127 | 36087 | 160 |
| 10 | Mono zinc phosphate (MZP) | 48811 | 45637 | 39569 | 160 |
| 11 | SAPP (Sodium dihydrogen pyrophosphate) | 48886 | 42600 | 35537 | 160 |
| 12 | Zinc oxide | 50224 | 41670 | 34408 | 160 |
| 13 | Sodium phenyl phosphinate (SPP) | 48727 | 44618 | 38882 | 160 |
| 14 | Trisodium phosphate | 47650 | 42305 | 34654 | 160 |
| 15 | Phosphoric acid dipentyl ester sodium salt | 47754 | 41932 | 34629 | 160 |

*Estimated RTI rating based on the Mp retention.

No clear improvement was observed in the heat aging performance of the resin containing 350 ppm OH endgroup content containing various stabilizers; only MZP and SPP showed marginal improvement in thermal stability as measured by the decrease in Mp over time. However, the compounding of MZP and SPP into the polymer resulted in a product with hazy appearance, precluding their use as a stabilizer. None of the stabilizers resulted in the thermal stability performance of the resin that contained <10 ppm OH endgroup content.

Alternative Examples 16-51

An additional set of stabilizers were compounded into resin of Formula (III) containing 350 ppm hydroxy endgroups as described for examples 1-15, in the amounts shown in Table 12. The compounding process provided resin in the form of pellets. The amounts of stabilizer compounded into the resin are in weight percent based on the total weight of the composition.

TABLE 12

| Alternative Example | CAS | NAME | AMOUNT | SOURCE |
|---|---|---|---|---|
| 16 | 119345-01-6 | Irgafos ® P-EPQ | 0.60% | Ciba |
| 17 | 29690-82-2 | Epoxy Cresol Novolac (ECN 1299) | 0.60% | Ciba |
| 18 | 82091-12-1 | BMSC | 0.60% | Sabic BoZ |
| 19 | | Polycarbonate Grade 100 | 1.00% | Sabic MtV |
| 20 | 42955-03-3 | Torlon 9000T | 1.00% | Solvay |
| 21 | 34052-90-9 | 1,3-Phenylene-bis-oxazoline (BOX) | 0.60% | |
| 22 | | Marlex Concentrate 10% Fine Grinds | 6.00% | Sabic MtV |
| 23 | | PPS Ryton S4 | 0.60% | Phillips |
| 24 | 71878-19-8 | Chimassorb 944 LD | 0.60% | Ciba |
| 25 | 84989-41-3 | Aquapel 364 (Alkyl Ketene Dimer) | 0.60% | |
| 26 | 7704-34-9 | Elemental Sulfur | 0.30% | Aldrich |
| 27 | 38103-06-9 | BPADA | 0.60% | Sabic MtV |
| 28 | 115-83-3 | Pentaerythrityl tetrastearate | 0.60% | |
| 29 | | Nylon 6-6 | 0.60% | |
| 30 | | PBT 195 Fine Grind | 0.60% | Sabic |
| 31 | 29598-76-3 | Seenox 412-S | 0.60% | |
| 32 | | D9000 Siltem Fines | 0.30% | Sabic MtV |
| 33 | 26061-90-5 | Bondfast E (Poly-ethylene-co-glycidyl methacrylate) | 0.60% | Sumitomo |
| 34 | 13676-54-5 | Bismaleimide | 0.60% | Aldrich |
| 35 | | Irgafos 12 | 0.60% | Ciba |
| 36 | | Irganox 1098 | 0.60% | Ciba |
| 37 | | Irganox 1035 | 0.60% | Ciba |
| 38 | 2386-87-0 | Joncryl ADR | 0.60% | Basf |
| 39 | | Epocros RPS-1005 | 0.60% | |
| 40 | 108-30-5 | Succinic Anhydride | 0.60% | Aldrich |
| 41 | 941-69-5 | Phenylmaleimide | 0.60% | |
| 42 | 10081-67-1 | Nauguard 445 | 0.60% | Chemtura |
| 43 | 89-32-7 | Benzene Tetra-carboxylic Dianhydride | 0.60% | Aldrich |
| 45 | | Irganox 1010 | 0.60% | Ciba |
| 46 | | Irganox 1330 | 0.60% | Ciba |
| 47 | 5949-29-1 | Citric Acid | 0.60% | Aldrich |
| 48 | 108-31-6 | Maleic Anhydride | 0.60% | Aldrich |
| 49 | 497-19-8 | Sodium Carbonate | 0.60% | Aldrich |
| 50 | | Irgafos 168 | 0.60% | Ciba |
| 51 | 10101-89-0 | Trisodium Phosphate | 0.60% | Aldrich |
| 52 | | Resin with 350 ppm OH (Resin III) | | SABIC |

The obtained compounded pellets were aged using the accelerated heat aging test at 230° C., using our previously described Accelerated Heat Aging Test Method. The molecular weight of the compounded pellets was measured before heat aging, after 6 days of aging and after 13 days of aging. The molecular weight of the polyetherimide having a hydroxyl end group content of 350 ppm prior to aging, after 6 days of aging and after 13 days of aging is shown for comparison. The starting and heat aged pellets were analyzed by gel permeation chromatography (GPC) to determine the peak molecular weight (Mp). Results are shown in Table 13.

TABLE 13

| Alternative Example | Stabilizer | days @ 230° C. | | | RTI |
|---|---|---|---|---|---|
| | | 0 | 6 | 13 | |
| 16 | Irgafos ® P-EPQ | 48379 | 43727 | 38401 | 160 |
| 17 | Epoxy Cresol Novolac (ECN 1299) | 49933 | 41319 | 30642 | 160 |
| 18 | BMSC | 50609 | 45290 | 36835 | 160 |
| 19 | Polycarbonate Grade 100 | 50593 | 46117 | 38416 | 160 |
| 20 | Torlon 9000T | 50406 | 46635 | 40629 | 160 |
| 21 | 1,3-Phenylene-bis-oxazoline (BOX) | 47301 | 43197 | 37814 | 160 |
| 22 | Marlex Concentrate 10% Fine Grinds | 50612 | 44570 | 41792 | 160 |

TABLE 13-continued

| Alternative Example | Stabilizer | 0 | 6 | 13 | RTI |
|---|---|---|---|---|---|
| 23 | PPS Ryton S4 | 50181 | 47799 | 42156 | 160 |
| 24 | Chimassorb 944 LD | 47055 | 40125 | 32482 | 160 |
| 25 | Aquapel 364 (Alkyl Ketene Dimer) | 50493 | 39231 | 31272 | 160 |
| 26 | Elemental Sulfur | 47070 | 42363 | 37404 | 160 |
| 27 | BPADA | 50460 | 41646 | 37415 | 160 |
| 28 | Pentaerythrityl tetrastearate | 51153 | 45445 | 31942 | 160 |
| 29 | Nylon 6-6 | 48004 | 39959 | 37072 | 160 |
| 30 | PBT 195 Fine Grind | 50383 | 42491 | 34054 | 160 |
| 31 | Seenox 412-S | 51028 | 42013 | 36115 | 160 |
| 32 | D9000 Siltem Fines | 50534 | 42806 | 37697 | 160 |
| 33 | Bondfast E (Polyethylene-co-glycidyl methacrylate) | 51294 | 45368 | 37219 | 160 |
| 34 | Bismaleimide | 50440 | 43813 | 36860 | 160 |
| 35 | Irgafos 12 | 47619 | 44286 | 38954 | 160 |
| 36 | Irganox 1098 | 48515 | 44772 | 33870 | 160 |
| 37 | Irganox 1035 | 50680 | 42852 | 33520 | 160 |
| 38 | Joncryl ADR | 50891 | 40876 | 28267 | 160 |
| 39 | Epocros RPS-1005 | 50184 | 41739 | 35008 | 160 |
| 40 | Succinic Anhydride | 50332 | 44197 | 36289 | 160 |
| 41 | Phenylmaleimide | 49359 | 44273 | 37364 | 160 |
| 42 | Nauguard 445 | 50430 | 45316 | 40595 | 160 |
| 43 | Benzene Tetracarboxylic Dianhydride | 50853 | 44618 | 36149 | 160 |
| 45 | Irganox 1010 | 50649 | 40649 | 31722 | 160 |
| 46 | Irganox 1330 | 50737 | 40260 | 30861 | 160 |
| 47 | Citric Acid | 50349 | 43539 | 35985 | 160 |
| 48 | Maleic Anhydride | 49951 | 42610 | 32493 | 160 |
| 49 | Sodium Carbonate | 47784 | 47223 | 39949 | 160 |
| 50 | Irgafos 168 | 51074 | 44003 | 38923 | 160 |
| 51 | Trisodium Phosphate | 46474 | 45228 | 38362 | 160 |
|  | starting resin | 49944 | 46083 | 39342 | 160 |

Some improvement in the heat aging performance of the resin was observed with the use of Irgafos 12, Naugard 445, and polyphenylene sulfide. The inorganic bases sodium carbonate and trisodium phosphate also showed improvement but the pellets were hazy or opaque, precluding their use as a heat stabilizer. A useful heat stabilizer can not affect the haze, opacity, or color of the resin. The most favorable stabilizers from these examples 16 to 51 were studied further.

Alternative Examples 52-94

The stabilizers and combinations of stabilizers listed in Tables 14 and 15 were compounded into resin with Formula (III) containing 350 ppm of hydroxy endgroups as previously described for alternative examples 1-15, in the amounts shown. Amounts are in weight percent based on the total weight of the composition.

TABLE 14

| Alternative Example | CAS | NAME | AMOUNT |
|---|---|---|---|
| 52 |  | PPS Ryton S4 | 0.30% |
| 53 |  | PPS Ceramer | 0.30% |
| 54 |  | PPS F7100 site | 0.50% |
| 55 |  | PPS F7100 site | 0.30% |
| 56 |  | PPS F7100 site | 0.10% |
| 57 |  | Irgafos 12 | 0.50% |
| 58 |  | Irgafos 12 | 0.30% |
| 59 |  | Irgafos 12 | 0.10% |
| 60 | 10081-67-1 | Nauguard 445 | 0.30% |
| 61 | 71878-19-8 | Chimassorb 944LD | 0.30% |
| 62 |  | Tinuvin 622 LD | 0.30% |
| 63 |  | UVINUL 5050H (F2305) | 0.30% |
| 64 |  | Na2CO3 | 0.01% |
| 65 |  | K2CO3 | 0.01% |
| 66 | 10101-89-0 | Trisodium Phosphate | 0.50% |
| 67 | 10101-89-0 | Trisodium Phosphate | 0.10% |
| 68 | 10101-89-0 | Trisodium Phosphate | 0.01% |
| 69 |  | CYASORB UV 3638 (F6525) | 0.30% |
| 70 |  | Irgafos 168 (F542) | 0.30% |
| 71 |  | Ultranox 626 | 0.30% |
| 72 |  | Seenox 412-S | 0.30% |
| 73 |  | Irganox 1024 | 0.30% |
| 74 |  | Naugard XL-1 | 0.30% |
| 75 | 4297-95-4 | Sodium phenyl phosphenate | 0.05% |
| 76 | 13598-37-3 | Mono zinc phosphate | 0.30% |
| 77 |  | Diaminodiphenylsulfone | 0.30% |
| 78 |  | Copper bromide | 0.01% |
| 79 |  | CuAc (50 ppm) + KI (1500 ppm) | 0.155% |
| 80 |  | Chimassorb 2020 | 0.30% |
| 81 |  | 4-(Trifluoromethylthio)benzamide | 0.30% |
| 82 |  | 3-(Trifluoromethyl)phenyl thiourea | 0.30% |
| 83 |  | Vanox PML | 0.30% |
| 84 |  | Vanox MBM mpd bis-maleimide | 0.30% |
| 85 |  | Agerate Stalite S | 0.30% |
| 86 |  | Vanox 12 | 0.30% |

TABLE 15

| Alternative Example | NAME | AMOUNT | NAME | AMOUNT |
|---|---|---|---|---|
| 87 | PPS F7100 site | 0.30% | Irgafos 12 | 0.30% |
| 88 | PPS F7100 site | 0.30% | Naugard 445 | 0.30% |
| 89 | PPS F7100 site | 0.30% | Na3PO4 | 0.10% |
| 90 | Irgafos 12 | 0.30% | Naugard 445 | 0.30% |
| 91 | Irgafos 12 | 0.30% | Na3PO4 | 0.10% |
| 92 | Naugard 445 | 0.30% | Na3PO4 | 0.10% |
| 93 | Seenox 412-S | 0.30% | Irgafos 12 | 0.30% |
| 94 | Seenox 412-S | 0.30% | Irganox 1024 | 0.30% |

The resulting compounded resin pellets were tested as described above in Alternative Examples 1-15. Results are shown in Table 16.

TABLE 16

| Alternative Example | Stabilizer | 0 | 6 | 13 |
|---|---|---|---|---|
| 52 | PPS Ryton S4 | 49741 | 47556 | 42753 |
| 53 | PPS Ceramer | 49767 | 46369 | 41847 |
| 54 | PPS F7100 site | 49784 | 47093 | 43241 |
| 55 | PPS F7100 site | 49987 | 47006 | 42535 |
| 56 | PPS F7100 site | 49799 | 46648 | 41663 |
| 57 | Irgafos 12 | 47857 | 45759 | 42447 |
| 58 | Irgafos 12 | 48064 | 46065 | 42307 |
| 59 | Irgafos 12 | 48953 | 46008 | 41927 |
| 60 | Nauguard 445 | 49720 | 46311 | 42409 |
| 61 | Chimassorb 944LD | 48566 | 45162 | 40278 |
|  | CDU | 49887 | 45441 | 40624 |
| 62 | Tinuvin 622 LD | 47954 | 44583 | 40369 |
| 63 | UVINUL 5050H (F2305) | 48875 | 44244 | 40391 |
| 64 | Na$_2$CO$_3$ | 49590 | 45235 | 40389 |
| 65 | K$_2$CO$_3$ | 46243 | 43163 | 38530 |
| 66 | Trisodium Phosphate | 47260 | 46346 | 42069 |
| 67 | Trisodium Phosphate | 46629 | 44367 | 39573 |
| 68 | Trisodium Phosphate | 49397 | 44970 |  |

TABLE 16-continued

| Alternative Example | Stabilizer | days @ 230° C. | | |
|---|---|---|---|---|
| | | 0 | 6 | 13 |
| 69 | CYASORB UV 3638 (F6525) | 49719 | 46306 | 41442 |
| 70 | Irgafos 168 (F542) | 49527 | 45750 | 41963 |
| 71 | Ultranox 626 | 48777 | 46503 | 42588 |
| 72 | Seenox 412-S | 49697 | 43705 | 38841 |
| 73 | Irganox 1024 | 49231 | 44047 | 39550 |
| 74 | Naugard XL-1 | 49619 | 43609 | 38554 |
| 75 | Sodium phenyl phosphenate | 46435 | 45204 | 41217 |
| 76 | Mono zinc phosphate | 49389 | 46507 | 41312 |
| 77 | Diaminodiphenylsulfone | 49066 | 46793 | 42456 |
| 78 | Copper bromide | 49868 | 44251 | 39206 |
| 79 | CuAc (50 ppm) + KI (1500 ppm) | 49396 | 43245 | 37107 |
| | NDU | 53196 | 51179 | 47921 |
| 80 | Chimassorb 2020 | 48974 | 44590 | 40555 |
| 81 | 4-(Trifluoromethylthio)benzamide | 49362 | 47168 | 42859 |
| 82 | 3-(Trifluoromethyl)phenyl thiourea | 49499 | 47319 | 42124 |
| 83 | Vanox PML | 48836 | 46787 | 41871 |
| 84 | Vanox MBM mpd bis-maleimide | 49685 | 46365 | 41908 |
| 85 | Agerate Stalite S | 49650 | 46694 | 42715 |
| 86 | Vanox 12 | 49862 | 46428 | 42762 |
| 87 | PPS F7100 site/Irgafos 12 | 48360 | 46900 | 43098 |
| 88 | PPS F7100 site/Naugard 445 | 49586 | 46170 | 42483 |
| 89 | PPS F7100 site/Na3PO4 | 46784 | 46045 | 40461 |
| 90 | Irgafos 12/Naugard 445 | 48054 | 45558 | 41929 |
| 91 | Irgafos 12/Na3PO4 | 48694 | 44720 | 40035 |
| 92 | Naugard 445/Na3PO4 | 47116 | 45516 | 41573 |
| 93 | Seenox 412-S/Irgafos 12 | 48067 | 42910 | 38158 |
| 94 | Seenox 412-S/Irganox 1024 | 49602 | 43149 | 36982 |

The above screening in addition to evaluations based on changes in glass transition point depression, polydispersity index, resin color, resin color thermal stability, presence of haze or opacity, odor upon compounding, phase separation, molding issues and other factors led to the conclusion that Irgafos 12, Naugard 445 and Ultranox 626 showed the best improvement in heat aging performance overall, and thus they were selected as formulations for actual RTI testing. Unfortunately, the selected stabilizers did not work as shown in Alternative Examples 95-100, further discussed below Alternative Examples 95-100

Resin of Formula (III) containing 350 ppm of hydroxy endgroups was compounded with Irgafos 12, Naugard 445 and Ultranox 626 as previously described for alternative Examples 1-15 in the amounts shown in Table 17. The compounded pellets along with control materials were then tested by the Underwriters Laboratories RTI test UL746B. After extensive testing including examination of the extrusion conditions no improvement was seen in the RTI values of the compositions containing stabilizers when compared to the base polyetherimide (having a hydroxyl end group content of 350 ppm) without stabilizers. All the materials shown in Table 17 had an RTI of 160° C. or lower. The stabilizer approach to raise the RTI of a resin with Formula (III) containing >100 ppm of hydroxy end groups was abandoned.

TABLE 17

| Example | Resin | OH content of resin (ppm) | Stabilizer (wt % with respect to weight of resin) |
|---|---|---|---|
| 95 | Formula III | 350 | Naugard 445 (0.3 wt %) |
| 96 | Formula III | 350 | Naugard 445 (0.3%)l Irgafos 12 (0.1 wt %) |

TABLE 17-continued

| Example | Resin | OH content of resin (ppm) | Stabilizer (wt % with respect to weight of resin) |
|---|---|---|---|
| 97 | Formula III | 350 | Irgafos 12 (0.1 wt %) |
| 98 | Formula III | 350 | Irgafos 12 (0.2 wt %) |
| 99 | Formula III | 350 | Ultranox 626 (0.3 wt %) |

Although the present invention has been described in detail with reference to certain preferred versions thereof, other variations are possible. Therefore, the spirit and scope of the appended claims should not be limited to the description of the versions contained therein.

The invention claimed is:

1. A polyetherimide comprising a structural unit of Formula (I):

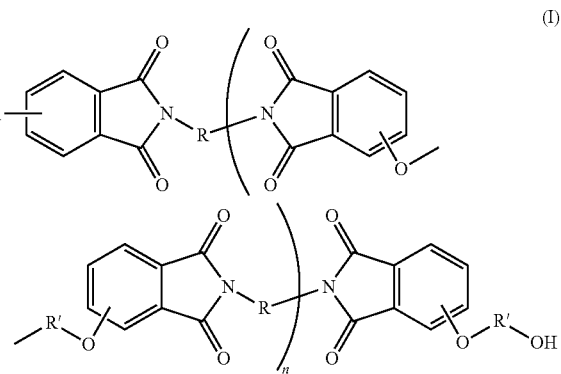

wherein R and R' can be a linear or cyclic $C_2$ to $C_{20}$ alkyl group or a substituted or unsubstituted $C_6$ to $C_{30}$ aryl group, n has a value of 1 to 40,
  wherein the polyetherimide has an OH content that is greater than 0 and less than or equal to 100 parts per million by weight (ppm);
  wherein the polyetherimide has a Relative Thermal Index that is greater than or equal to 170° C. measured using the protocol UL746B; and
  wherein the polyetherimide has a chlorine content that is greater than 0 ppm.

2. The polymer of claim 1, wherein chlorine content is present in an amount greater than 0 to 4,000 ppm.

3. The polymer of claim 1, wherein the polyetherimide has a flame retardant rating of V0 at 1.5 mm.

4. The polymer of claim 3, wherein the polyetherimide has a flame retardant rating of V0 at 0.8 mm.

5. A composition comprising the polyetherimide of claim 1 and an additional polymer.

6. The composition of claim 5, wherein the additional polymer is selected from the group consisting of polyesters, polycarbonates, polyolefins, polysulfones, polyphenylene sulfides, polyetheretherketones, polyethersulfones, polyamides, polyamideimides, and combinations thereof.

7. The polyetherimide of claim 1 having the structural unit of Formula (III):

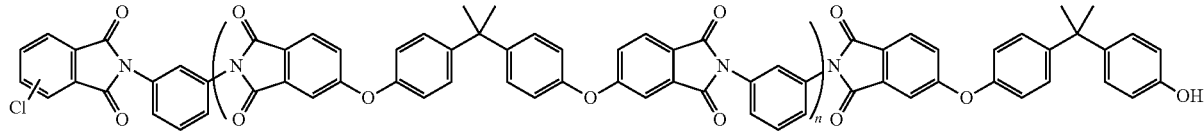

wherein n is an integer having a value of 1 to 40.

8. A composition comprising the polyetherimide of claim 7 and an additional polymer.

9. The composition of claim 8, wherein the additional polymer is selected from the group consisting of polyesters, polycarbonates, polyolefins, polysulfones, polyphenylene sulfides, polyetheretherketones, polyethersulfones, polyamides, polyamideimides, and combinations thereof.

10. A method for preparing the polyetherimide of claim 1, which comprises
contacting, in o-dichlorobenzene or anisole as diluent, substantially equimolar amounts of
a disodium salt of a dihydroxy compound of formula HO—R'—OH, and
a slurry of a bisimide, in the presence of a catalytically active amount of a phase transfer catalyst, thereby polymerizing the bisimide and the disodium salt;
wherein the bisimide and the disodium salt are polymerized in the presence of a base selected from alkali metal carbonates, alkyl hydrides, alkali metal hydroxides, alkali metal phosphates, alkali metal bicarbonates, alkali metal acetates, and combinations thereof;
wherein said slurry of bisimide comprises the reaction product of a mixture comprising a diamine of formula $H_2N$—R—$NH_2$; chlorophthalic anhydride; and o-dichlorobenzene or anisole; and an optional imidization catalyst, said mixture having a solids content of greater than or equal to about 5% by weight;
wherein the base is added in an amount that is sufficient to produce the polyetherimide of claim 1.

11. The method of claim 10, wherein the bisimide is made by reacting chlorophthalic anhydride and excess amount of diamine or a stoichiometric amount of diamine.

12. The method of claim 10, wherein the method further comprises adding a capping agent and capping amine groups.

13. The method of claim 12, wherein the capping agent is selected from the group consisting of chlorophthalic anhydrides, phthalic anhydrides, substituted phthalic anhydrides, alkyl anhydrides, cyclic alkyl anhydrides, substituted aryl anhydrides, acyl alkyl halides, acyl aryl halides, aldehydes, ketones, esters, isocyanates, chloroformates, sulfonyl chlorides, and combinations thereof.

14. The method of claim 10, wherein the disodium salt has excess sodium hydroxide and is caustic rich.

15. The method of claim 10, wherein the base is $K_3PO_4$.

16. The method of claim 15, wherein the $K_3PO_4$ is added in the form of solid or an aqueous solution.

17. The method of claim 16, wherein the $K_3PO_4$ is added in an aqueous solution and the $K_3PO_4$ is dried with bisphenol A disodium salt or 1,3-bis[N-(4-chlorophthalimido)]benzene prior to addition to the slurry.

18. The method of claim 16, wherein the $K_3PO_4$ is added as a solid.

19. The method of claim 18, wherein the $K_3PO_4$ added has a particle size of greater than 0 to 400 microns.

20. The method of claim 19, wherein the $K_3PO_4$ added has a particle size ranging greater than 0 to less than 75 microns.

21. The method of claim 13, wherein the alkali metal hydroxide is sodium hydroxide.

22. The method of claim 10, wherein the disodium salt is a bisphenol A disodium salt, the bisimide slurry is a slurry of 1,3-bis[N-(4-chlorophthalimido)]benzene, and the phase transfer catalyst is hexaalkylguanidinium chloride wherein said slurry of 1,3-bis[N-(4-chlorophthalimido)]benzene comprises the reaction product of a mixture comprising m-phenylenediamine; 4-chlorophthalic anhydride; and o-dichlorobenzene or anisole; and an optional imidization catalyst, said mixture having a solids content of greater than or equal to about 5% by weight.

23. A polymer comprising a polyetherimide having the structure of Formula (III):

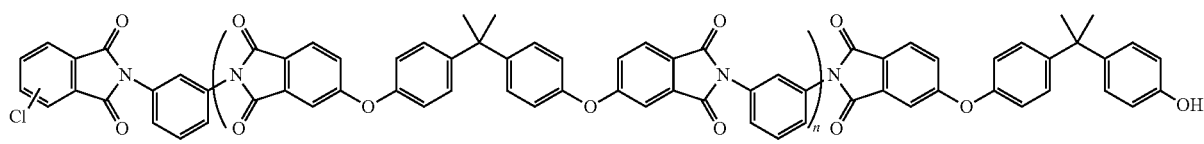

wherein the polyetherimide has an OH content that is greater than 0 and equal or less than 100 ppm;
wherein the polyetherimide has a Relative Thermal Index that is greater than or equal to 170° C. measured using the protocol UL746B; and
wherein the polyetherimide has a chlorine content that is greater than 0 and less than or equal to 4000 ppm;
wherein the polyetherimide is made by a method comprising
contacting, in o-dichlorobenzene or anisole as diluent, substantially equimolar amounts of bisphenol A disodium salt and a slurry of 1,3-bis[N-(4-chlorophthalimido)] benzene, in the presence of a catalytically active amount of a hexaalkylguanidinium chloride as a phase transfer catalyst, thereby polymerizing the 1,3-bis[N-(4-chlorophthalimido)]benzene and the bisphenol A disodium salt;
wherein the 1,3-bis[N-(4-chlorophthalimido)]benzene and the bisphenol A disodium salt are polymerized in the presence of a base selected from the group consisting of alkali metal carbonates, alkyl hydrides, alkali metal phosphates, alkali metal bicarbonates, alkali metal hydroxides, alkali metal acetates, and combinations thereof;

wherein said slurry of 1,3-bis[N-(4-chlorophthalimido)]benzene comprises the reaction product of a mixture comprising m-phenylenediamine; 4-chlorophthalic anhydride; and o-dichlorobenzene or anisole; and an optional imidization catalyst, said mixture having a solids content of greater than or equal to about 5% by weight wherein the base is added in an amount that is sufficient to produce the polyetherimide of claim 1.

24. An article comprising the polymer of claim 1.
25. An article comprising the polymer of claim 7.
26. An article comprising the composition of claim 5.
27. An article comprising the composition of claim 8.
28. A composition comprising the polyetherimide of claim 1 and a polyimide other than the polyetherimide of claim 1.
29. A composition comprising the polyetherimide of claim 7 and a polyimide other than the polyetherimide of claim 7.

* * * * *